(12) United States Patent
Morgan et al.

(10) Patent No.: US 7,997,984 B2
(45) Date of Patent: Aug. 16, 2011

(54) METHOD AND SYSTEM OF REAL VIDEO GAMING

(75) Inventors: Dan C. Morgan, San Jose, CA (US); Jon Shiell, San Jose, CA (US); Ian Chen, San Jose, CA (US)

(73) Assignee: Real Video Gaming, Inc., San Jose, CA (US)

( * ) Notice: Subject to any disclaimer, the term of this patent is extended or adjusted under 35 U.S.C. 154(b) by 277 days.

(21) Appl. No.: 11/554,585

(22) Filed: Oct. 30, 2006

(65) Prior Publication Data

US 2007/0117637 A1 May 24, 2007

Related U.S. Application Data

(60) Provisional application No. 60/731,453, filed on Oct. 28, 2005.

(51) Int. Cl.
*A63F 9/24* (2006.01)
(52) U.S. Cl. ................ 463/31; 463/16; 463/17; 463/18; 463/19; 463/20; 463/42
(58) Field of Classification Search ............. 463/16–22, 463/30–35, 39–43
See application file for complete search history.

(56) References Cited

U.S. PATENT DOCUMENTS

| 4,662,635 | A | 5/1987 | Enokian |
| 5,411,258 | A | 5/1995 | Wilson et al. |
| 6,004,211 | A | 12/1999 | Brenner et al. |
| 6,508,709 | B1* | 1/2003 | Karmarkar ...................... 463/42 |
| 2003/0144057 | A1 | 7/2003 | Brenner |
| 2004/0121834 | A1* | 6/2004 | Libby et al. ..................... 463/19 |
| 2005/0130728 | A1 | 6/2005 | Nguyen et al. |
| 2005/0159212 | A1 | 7/2005 | Romney et al. |
| 2006/0178187 | A1* | 8/2006 | Walker et al. ................... 463/16 |

FOREIGN PATENT DOCUMENTS

| WO | WO 99/26204 A1 | 5/1999 |
| WO | WO 00/25876 A1 | 5/2000 |
| WO | WO 00/79467 | 12/2000 |
| WO | WO 01/03088 A1 | 1/2001 |

* cited by examiner

*Primary Examiner* — Peter DungBa Vo
*Assistant Examiner* — Steve Rowland
(74) *Attorney, Agent, or Firm* — Quine Intellectual Property Law Group, P.C.; Stephen J. LeBlanc

(57) ABSTRACT

Methods and systems for gaming over a network or communications medium such as via the Internet. In specific embodiments, a real video gaming experience is generated by for a player at a client system from a sequence of real world derived chance events and associated video clips. The server system optionally provides a sequence in an encoded format and the sequence is delivered to the client where the client uses the sequence to create a game of chance for a player.

23 Claims, 15 Drawing Sheets

BJ example 1
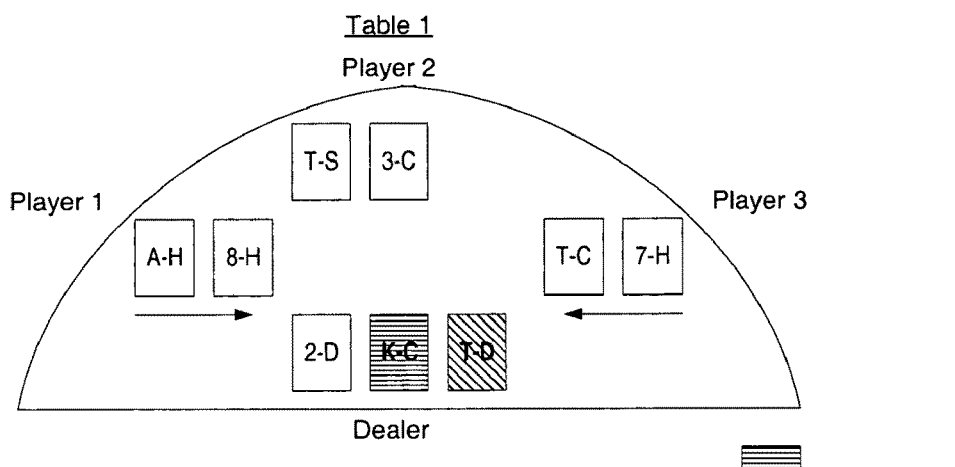
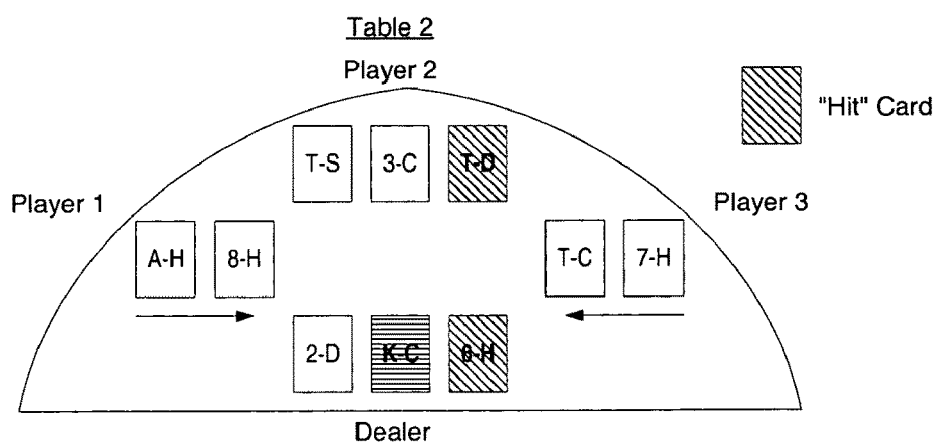
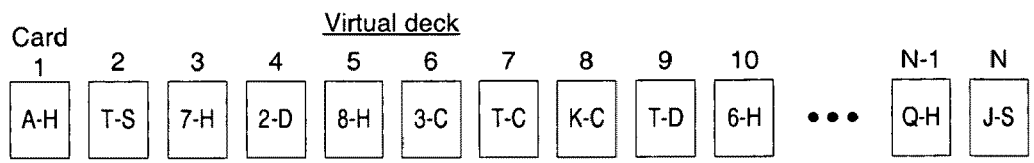
*FIG. 3A*

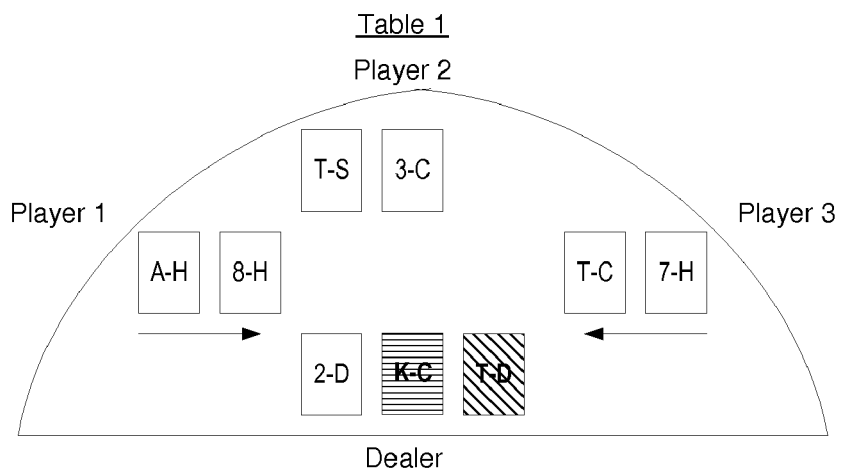
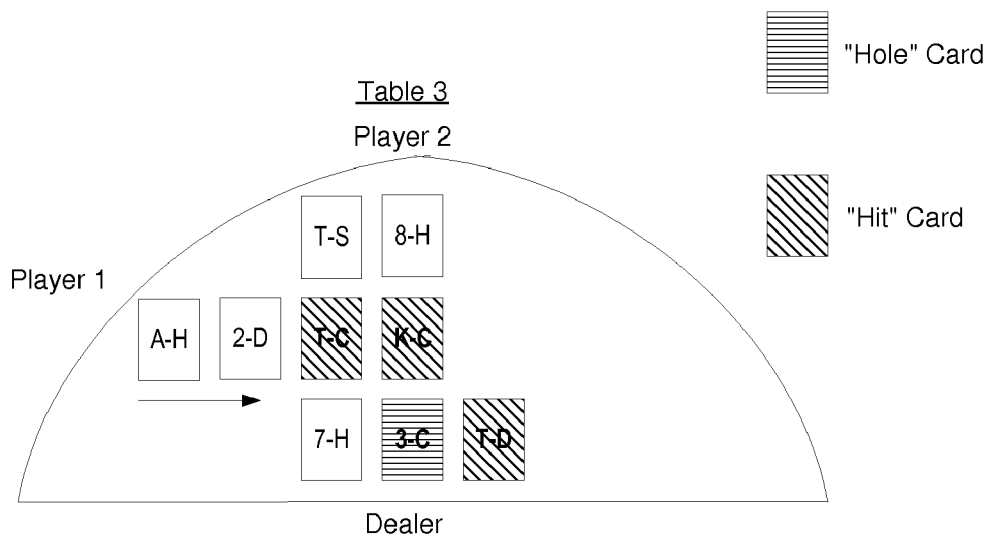
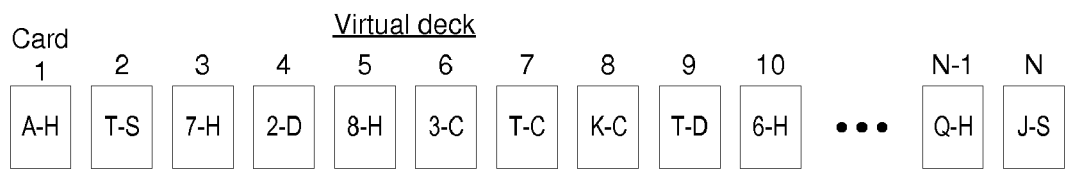
*FIG. 3B*

Craps IMAGE 1:
Left Side　　　　　　　　　　Center　　　　　　　　　　Right side

Craps IMAGE 2:

Example Film Clip Processing

| Film clip of the dice roll on empty table |
|---|

Subtract, pixel from pixel, frame from frame

| Film clip (same length) of the empty table |
|---|

Adjust transparency (pixels equal means transparent) and the result is

| Film clip of the dice roll "in space", i.e. everything but the dice is transparent |
|---|

Compress the clip, also at this stage image recognation maybe performed on the dice

| Film clip of the dice roll "in space", i.e. everything but the dice is transparent |
|---|

*FIG. 5*

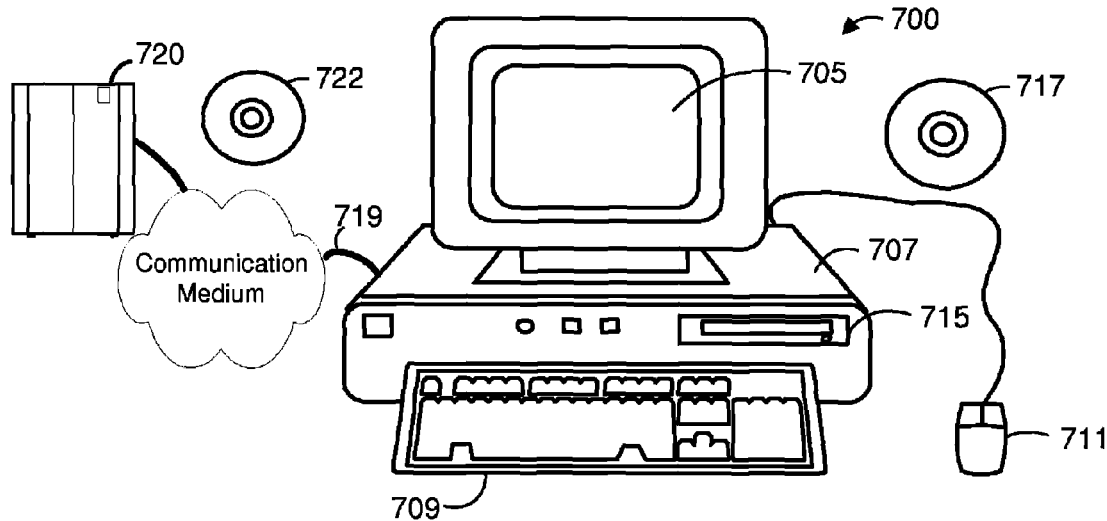

*FIG. 13*

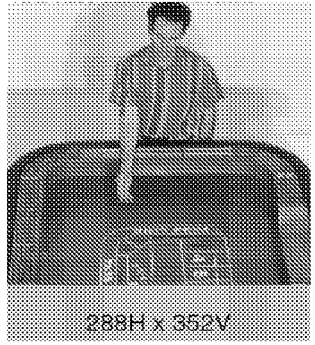

288H x 352V

Text area for advertising....................
ads can be shown during the betting
phase, ads are CIF at not more than
20 fps
line 5
line 6 (also settlement display area)

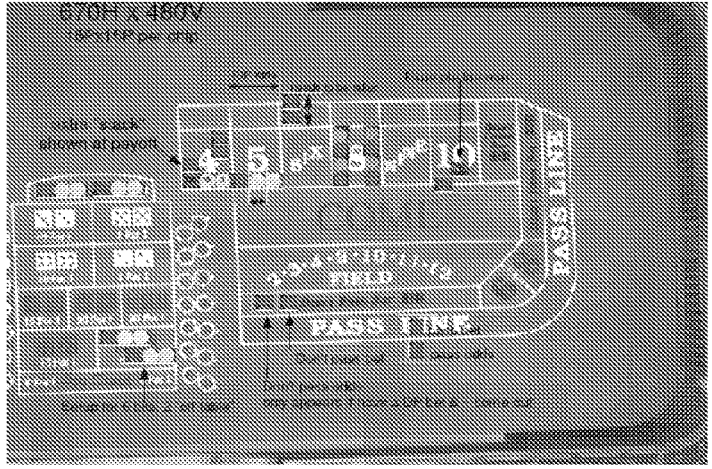

Betting phase timing bar
1/2 green
3/8 yellow
1/8 red
actual time (and % per color) depends
on the table, but is normally around 40
seconds and the settlement phase
around 15 seconds
most tables will have a "cycle time" of
approx 1 minute
Bar is replaced by "Rolling" and
"Settling" phase titles, as per phase Betting rack Balance: $x,xxx click on a bet during the settlement
phase to collect it if the default is "let
it ride"; right winnings only, left all of
it. also need collect winnings and
remove all bets buttons On mouse over (hold) on a players bet,
"pop-up" bet amt, mouse-over a point
shows the possible bet there (if any)

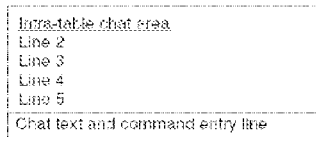

Intra-table chat area
Line 2
Line 3
Line 4
Line 5
Chat text and command entry line

*FIG. 7A*

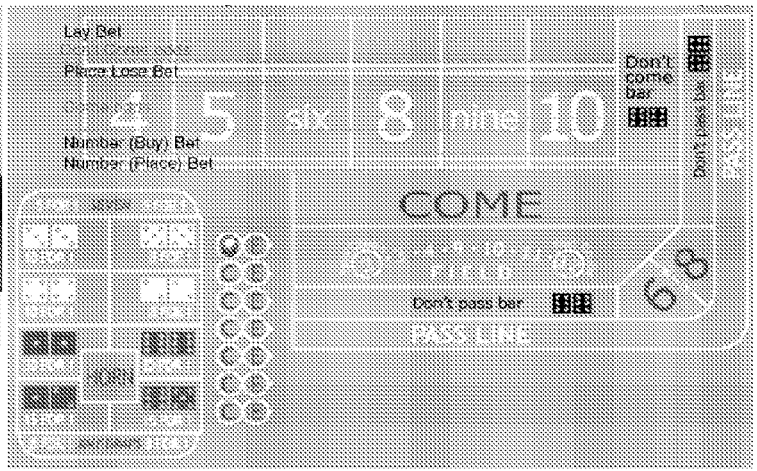

*FIG. 7B*

| User ID Database cvt user_id to all user information (all none key fields are encrypted) | Plays database cvt user_id with date and time to a film_name & result | Films file structure date\time\casino\game\table.film where table.film is the actual "film" of the game |

First and intermediate pages

```
Game review selection page                    page: n of m
Played on mm/dd/yy within 10 minutes of hh:mm ○ game, casino, time, bet & result
   ○ game, casino, time, bet & result
   ○ game, casino, time, bet & result
   ○ game, casino, time, bet & result
   ○ game, casino, time, bet & result
   ○ game, casino, time, bet & result
   ○ game, casino, time, bet & result
   ○ game, casino, time, bet & result Please check those you wish to have reviewed.
Then press Review selections or if none match
press More.

[Review      ] [Review      ]  ( More )
  [Selections  ] [all on page  ]
                                 ( Exit )
```

Last page

```
Game review selection page                    page: m of m
Played on mm/dd/yy within 10 minutes of hh:mm ○ game, casino, time, bet & result
   ○ game, casino, time, bet & result
   ○ game, casino, time, bet & result
   ○ game, casino, time, bet & result
   ○ game, casino, time, bet & result
   ○ game, casino, time, bet & result
   ○ game, casino, time, bet & result
   ○ game, casino, time, bet & result Please check those you wish to have reviewed.
Then press Review selections or if none match
press Done

[Review      ] [Review      ]  ( Done )
  [Selections  ] [all on page  ]
```

```
All of the following results were verified to be
correct, please mark those you wish to see a
replay of, then press a review button.

○ game, casino, time, bet & result
   ○ game, casino, time, bet & result
   ○ game, casino, time, bet & result
   ○ game, casino, time, bet & result
   ○ game, casino, time, bet & result
   ○ game, casino, time, bet & result
   ○ game, casino, time, bet & result
   ○ game, casino, time, bet & result

[Review      ] [Review      ]
        [Selections  ] [all on page ]
```

```
         Replay of game, casino, time, bet & result

┌──────────────────────────┐
              │                          │
              │     Video replays here   │
              │                          │
              └──────────────────────────┘

[ Video replay controls ]

( Request )   game, casino, time, bet,
         ( appeal  )   result, etc. shown here To see the next replay, press next or press
         Done to return to the select results screen ( Next )    ( Done )    ( Exit )
```

*FIG. 12*

METHOD AND SYSTEM OF REAL VIDEO GAMING

CROSS REFERENCE TO RELATED APPLICATIONS

This application claims benefit of priority from provisional application No. 60/731,453 filed Oct. 28, 2005, the contents of which are incorporated herein by reference for all purposes.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention in various embodiments is directed to business methods and/or logic processing methods and/or related systems to provide gamers with improved gambling experiences over a communication connection and/or to provide gaming or gambling providers with an increased ability to provide gaming opportunities.

In specific embodiments, the invention relates to gaming systems that allow a number of virtual games or virtual bets to be made, all based on the same chance outcome and where players may be separated in space and/or time from other players and from the chance event. In further embodiments, the invention allows for players to be provided with different or customized experiences and/or betting options even using the same underlying chance event.

In further embodiments, the invention relates to logic methods and/or business methods enabling a gaming server that provides a "trusted" $3^{rd}$ party with some independence from both the generator of chance events and a backend gambling provider to deliver gaming experiences to players.

BACKGROUND OF THE INVENTION

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

SUMMARY

According to specific embodiments, the present invention is involved with business methods and/or logic processing methods and/or systems and/or devices that can be used together or independently to provide a variety of different services and/or experiences related to gaming or gambling. In specific embodiments, the invention can be understood as involving new business methods related to gaming or gambling. In further embodiments, the invention can be understood as involved with systems and methods that can be used by a gaming provider to reduce costs and/or provide a wider variety of gaming experiences and/or locations.

In particular embodiments, the invention involves a system (e.g., RVG) that records and stores games (such as craps, roulette, blackjack, poker, slots) with video and/or audio maintained in a computer server in the form of individual video clips (e.g., one clip per gaming event. For example, one clip could be one hand of blackjack, a deal of one card, one roll of dice, one game at a craps table, one pull on a slot machine, etc.). At a desired time, RVG's server sends the pre-recorded films to a player in a sequence that allows the player to play the game and have a real video experience. Game transmission can be via the Internet, via Local Area Network, to mobile phones, etc.

In specific embodiments, in order to avoid a player experiencing delays in receiving video clips (such as bandwidth issues that are inherent with the internet if actual live games were involved), clips are sent in a batch mode (e.g., two or three hands at a time, or two or three craps games) to the player. Once clips are received on the player's local computer, the player will begin gaming on the first hand, and a second hand will be in the queue that is also held in the player's local computer memory.

Optionally, in further embodiments, once the player completes the first hand, and begins playing the second hand, the results of the first hand is sent back electronically to the RVG server. Once the first hand has been received and the information is recorded by the RVG server, a new third hand is sent back to the player and the process is repeated until the player elects to stop the game.

In further embodiments, a hand can be understood as any set of game moves or deals or rolls that makes sense in terms of completing a particular player experience. In some embodiments, a hand could be understood as a full deal including multiple players and in some embodiments a client system can store the sequence of the hand and provide play based on a single user's pass/hit requests. In other embodiments, all possible video clips may be stored locally and just the deal sequence transmitted and the video experience created at the local system.

In various embodiments, a game according to the invention can be played for fun (no fee to play), play for live gaming or gambling, optionally with the same odds as posted at a land-based casino, or as a play for contest/sweepstakes, where the results of one or more plays or simply participating in one or more plays, enters players into a contest or sweepstakes. The play for fun and play for contest in some embodiments has similarities to playing a video game, but, according to specific embodiments of the invention, with the desirable advantages of play based on underlying real-world chance events and option with real video. The play for contest allows players to be entered into a raffle, whereby, for example, a certain number of players would have a chance to play in a live tournament at a land-based casino. Thus, according to specific embodiments of the invention, various incentives can be provided to entice players to pay a fee for access to real video gaming of the invention.

As a more specific example, according to specific embodiments of the invention, players may pay a fixed fee, such as $14.95, to play 100 hands of real blackjack which may be live or stored according to various embodiments. Thus, in specific embodiments, the invention provides a number of novel ways allowing a virtual game to be followed by a live physical game for at least some players.

In further embodiments, by recording or prerecording games, players will be able to place bets in advance, and review the video, audio, and betting information anytime in the future. As an example, a player places 100 bets on 16 RED on the next 100 spins of a roulette wheel and then turns off the gaming device (PC, Mobile Phone, PDA). At a given time in the future the player turns back on their computer, and replays the actual 100 games that were bet on, including the ability to fast forward, pause, freeze frame, or slow play. A player can also choose to review only the results. With this process, the casino owner can also replay the games to verify authenticity prior to paying the player for winning games.

As a further example, the present invention, using real video gaming systems and methods, allows a single physical wheel to be used as the basis for multiple different games, such as with different betting limits, different play options, or in different locations. Using the methods and/or systems of the invention, a gambling provider can provide multiple experiences to players, leveraging the costs associated with running a roulette wheel or other chance event. As an example, consider a gambling provider that wishes to provide clients the opportunity to bet on a roulette game. In typical casino situations, for example, players sit at one wheel and the spinner takes the bets and activates the wheel and executes any payouts. Typically, each player at a given wheel must play exactly the same rules and same betting limits and typically must be present at the wheel to play.

Should the casino wish to provide a variety of possible roulette experiences, for example providing various games with different betting limits, or providing games where the wheel contains or does not contain a "00" or other everybody loses type position, the casino's only options were to either provide a separate wheel with separate betting table for each option or to migrate to purely electronic or simulated game play for individual players, which is often not as attractive to players as a live wheel.

Any number of further games of chance can be implemented according to specific embodiments of the invention, as further detailed below.

Various embodiments of the present invention provide methods and/or systems for gaming over a communications network. According to specific embodiments of the invention, a client system is provided with a set of interfaces that allow a user to perform such game related tasks as logging in, providing payment information, selecting one or more games to play, selecting betting and or play options during a game, etc.

The client system, in particular embodiments, furthermore has the ability to present video game clips and optionally to buffer a number of game clips to provide a real gaming experience to the player. In further embodiments, a client system has the ability to receive encoded and/or encrypted information about game progress, buffer that information, and only decode or decrypt and display that information at an appropriate time during game play after a player has placed bets or made game play option selections.

According to specific embodiments of the invention, the client system is in communication with a server system that provides various client interactions as described herein. The server system is also in communication with one or more entities acting as gambling backend providers and one or more entities acting as game video stream providers.

In response to a user input, the client system sends to a server system the necessary information to access, activate, and play one or more games. The server system uses the request data, and optionally one or more sets of server data, to process the request as well as communication with the other entities as described herein.

Thus, in further embodiments, the present invention may be understood in the context of gaming or gambling over a communication media. An important application for the present invention, and an independent embodiment, is in the field of providing a variety of casino style chance event games over the Internet, a local area private network, or a telephone network, optionally using Internet media protocols and formats, such as HTTP, HTTPS, RTTP, XML, HTML, dHTML, VRML, as well as image, audio, or video formats etc. However, using the teachings provided herein, it will be understood by those of skill in the art that the methods and apparatus of the present invention could be advantageously used in other related situations where users access content over a communication channel, such as modem access systems, institution network systems, wireless systems, etc.

Software Implementations

Various embodiments of the present invention provide methods and/or systems for gaming that can be implemented on a general purpose or special purpose information handling appliance using a suitable programming language such as Java, C++, Cobol, C, Pascal, Fortran., PL1, LISP, assembly, etc., and any suitable data or formatting specifications, such as HTML, JSP, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Other Features & Benefits

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

In some of the drawings and detailed descriptions below, the present invention is described in terms of the important independent embodiment of a system operating on a digital data network. This should not be taken to limit the invention, which, using the teachings provided herein, can be applied to other situations, such as cable television networks, wireless networks, etc. Furthermore, in some aspects, the present invention is described in terms of client/server systems. A number of computing systems and computing architectures are described in the art as client/server art. For the purposes of this description, client/server should be understood to include any architecture or configuration wherein an element acting as a client accesses a remote and/or separate program or device that is providing the desired service (e.g., a server).

All references, publications, patents, and patent applications cited herein are hereby incorporated by reference in their entirety for all purposes.

BRIEF DESCRIPTION OF THE DRAWINGS

FIG. 3A-B illustrate operation of a blackjack game presented to a player according to specific embodiments of the present invention.

FIG. 5 is a flow chart illustrating film clip processing according to specific embodiments of the present invention.

FIG. 7A-E illustrate various embodiments of a graphical user interface illustrating game play of a virtual craps game according to specific embodiments of the present invention.

FIG. 12 is a block diagram illustrating example user interfaces for review of games according to specific embodiments of the invention.

FIG. 13 is a block diagram showing a representative example logic device in which various aspects of the present invention may be embodied.

DESCRIPTION OF SPECIFIC EMBODIMENTS

Figure 1:
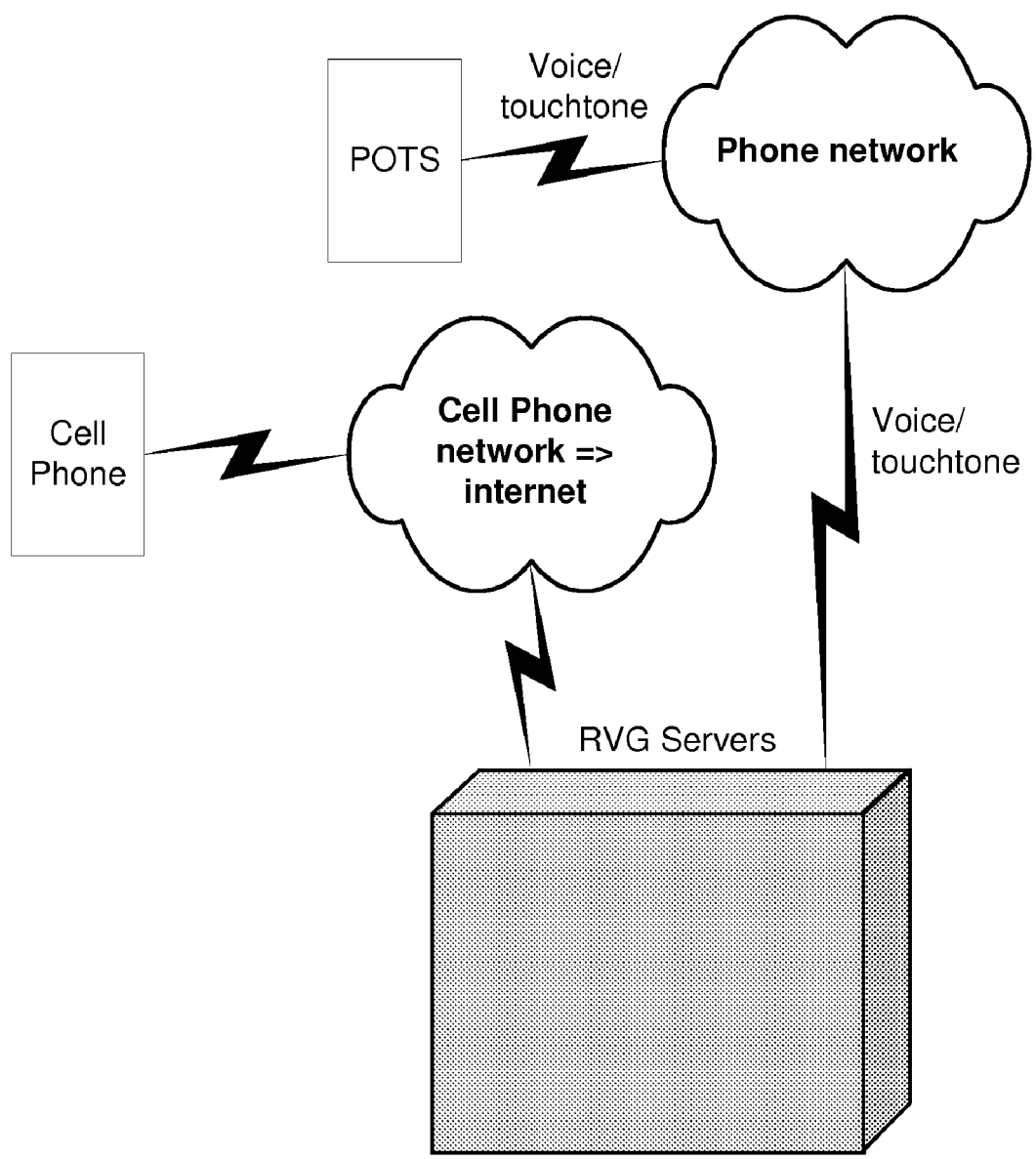
FIG. 1 is a block diagram illustrating a real video gaming server communicating with two players over a land telephone system (POTS) and a cell phone system according to specific embodiments of the invention.

Before describing the present invention in detail, it is to be understood that this invention is not limited to particular compositions or systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content and context clearly dictates otherwise. Thus, for example, reference to "a device" includes a combination of two or more such devices, and the like.

Unless defined otherwise, technical and scientific terms used herein have meanings as commonly understood by one of ordinary skill in the art to which the invention pertains. Although any methods and materials similar or equivalent to those described herein can be used in practice or for testing of the present invention, the preferred materials and methods are described herein.

1. Glossary

In describing and claiming the present invention, the following terminology will be used in accordance with the definitions set out below.

The term chance event as used herein should be understood to encompass any type of chance event upon which a gaming situation is based and that involves essentially a probability outcome. Thus, in a dice based game, the role of the dice is the chance event. In roulette, the final position of the ball is the chance event. In a card game, each draw of a card is a chance event. Chance events can be generated or determined through some physical or mechanical means, often, but not necessarily, using a human dealer. While this is a preferable embodiment of the invention, chance events can also be simulated using electronic or logic processing means, such as through a random number generator. The present invention in particular embodiments uses novel techniques to provide the flexibility and efficiency of electronic gaming along with the trustworthiness and player appeal of physically determined chance events. The present invention involves at least two broad classes of gaming or gambling involving chance events. Pure chance games are those where other than placing bets, a player does not affect the outcome of the game. For example, roulette and craps are two games where player action generally does not affect the outcome of the game. Fixed card games having a fixed number of players and fixed deal of cards to each player (e.g., 5 player 5 card stud) also can be considered pure chance games. Likewise BINGO, were a set number of balls is drawn regardless of how many earlier players make BINGO or where a set number of BINGO cards are played regardless of how many players enter the game.

The other broad category is partially chance determined games. In these games, player behavior, including the number of players, can affect the outcome. In 5-card stud, or BINGO, for example, the number of other participating players will affect the chance outcome. In card games involving some choice, such as blackjack or various forms of draw or fold poker, the choices made by a player can affect both that player's outcome and the outcome of other players.

The term game stream provider as used herein should be understood to encompass any type of game provider, whether an online gambling provider, a physical casino, a church or charity organization, or any entity or individual that provides a video stream or other data stream indicating the results of a chance event or a series of chance events. In some embodiments of the invention, a game stream provider should be understood as a separate entity from the game server. In other embodiments, a game server may provide some or all of its own game video streams.

The term game backend provider as used herein should be understood to encompass any type of gambling or gaming provider, whether an online gambling provider, a physical casino, a church or charity organization, or any entity or individual that provides players with an opportunity to make bets or collect winnings or enter contests or sweep stakes based on chance events provided by a video stream or other data stream indicating the results of a chance event or a series of chance events provided by the game stream provider. Note that, in some situations, the stream provided and the backend provider can be the same entity, or can each act as a different entity in different situations. As an example, consider two charities A and B that each have associated with them a membership or affiliations. On the first Friday of every month, charity A may run physical BINGO game and may provide that as a game stream provider to charity B, which acts as a game backend provider and makes the BINGO game available to its members using an RVG system according to the invention. On the third Friday of every month, Charity B runs the physical BINGO game, and makes the stream available to charity A. In other embodiments, a game server entity will also be the game backend provider.

The term game server (e.g., an RVG server) as used herein should be understood to encompass a trusted middle-man or operator that acts as the conduit for players and other parties to a game and that in some embodiments generally is trusted because it does not have any financial interest in the outcome of any particular game.

2. Overview

According to specific embodiments of the invention, the invention provides data processing systems and/or methods and/or business methods that can be used together to provide the benefits described herein. The invention in various embodiments and some of the benefits and features of embodiments of the invention can be understood as described generally below.

Portable/Flexible Gaming or Gambling

In a number of embodiments, the invention provides methods and/or systems for delivering to a player a gaming experience using an electronic communications network, either sound only (e.g., a telephone) or video optionally with sound (e.g., video over a digital network). In preferred embodiments of the present invention, however, unlike many other electronic gaming systems, the underlying chance event is a physical event, either stored or occurring in real or near real time. Thus, in specific embodiments, the invention can deliver to a player a portable and/or flexible playing experience that has desired attributes of live gaming or gambling.

Audit/Historical Video Trails for Gaming or Gambling

In some embodiments, the invention uses the techniques described herein to provide various history trails or audit trails of gaming events, allowing a player to review play after the chance event has happened, for example, and after the results are completed. A bingo player, for example, may subscribe on a monthly or yearly basis to their church's weekly bingo game. Even if the player is not present at the game, a pre-agreed number or configuration of BINGO cards are electronically reserved for the player, and the player participates in the game as if the player were there. If the player is not able to be physically present at the game, the player can either in real time with the game, or at some later time, replay the physical game and receive any winnings. The player could optionally simply check on the overall results of the evening at the end of game play.

Providing Multiple Gaming Opportunities Based on One Chance Event

Many games used for entertainment or gambling are based on the outcome of a chance event. The draw or fall of a ball (BINGO or roulette), the role of dice (craps), or the deal of cards. Whatever the chance event, there is an associated cost to the gambling provider of creating the event and ensuring its trustworthiness: the cost of the dealer/operator, the security and cost of the space, etc.

In most situations, the costs or restrictions of providing the physical chance event can limit the gaming opportunities that a gambling provider can make available. Church BINGO, for example, must generally take place at a single location, with a limited capacity seating, and at a set time. Many players who might like to participate cannot because of these limitations. Making BINGO available 24 hours a day, at multiple locations, and for any number of people who want to play, would be impossible for most organizations.

Casinos, likewise, even with much greater resources, cannot make games available as flexibly as many gamers might wish. Blackjack dealers, for example, are generally expensive and in somewhat limited supply. Even the largest casino cannot make physical blackjack available throughout a casino property, such as in every dining establishment or in every guest room.

In various embodiments, the present invention uses multiple novel techniques that allow a gambling provider to either leverage their own chance event to provide multiple gaming experiences or to use an event generated by another gambling provider.

3. Example System Description (APPENDIX A)

In specific embodiments, the invention provides a game server (one example of which is referred to as the Real Video Gaming™ (RVG) system), which in typical situations communicates with players at one interface and with a game backend provider and/or a game stream provider at different interfaces. Players connect with the RVG through any enabled connection interface, such as the Internet, a local or private network (eg a LAN), or a land or cellular telephone. For phones and cell phones without a browser interface a "touch-tone" menu driven system or even a live operator can be provider as a interface. Other systems such as close circuit TV & keypad, or in-room video system may also be used.

The RVG system can provide a number of services to players and game providers. These services are optional in various embodiments. Such services can include, for a new player, providing a check to verify the player is "ok" (age, valid CC, email address, etc) to have an account (and to play) then passes the setup transaction to the gaming backend provider. Otherwise for returning players, a game server verifies the identity of the player (via various known methods). Information kept by the game server can include that required to verify the player and an audit trail of the video stream. In other embodiments, where a game stream provider doesn't keep the information required to verify the player then the backend gaming provider would do the verification an provide an ok or not ok message back to the game server, along with a player ID of some sort. It is also possible for a $3^{rd}$ party "ID provider" to verify that the player is ok to play, in this case the main function of such a provider is only to verify players and provide the ok information back to the game server. It is worth noting that the "ID" passed back to the game server (or developed on said server it's self can include information about any "casino" player club memberships the player has, thus allowing the "casino" (acting as a backend, in this case) to optionally include the time spent playing on-line as player credit hours (the convertion ratio need not be the same as playing in the real casino) towards club bonuses, perks, etc. If the "casino" is also (or only) the game stream provider it may elect to comp at a different rate.

Generally, the game server acts as a conduit between the other three parties (e.g., the player, the backend gaming provider, and the game stream provider) and can perform such functions as determining the value of the ball for each spin of a roulette wheel or the card dealt, etc. and the game server reports gaming information to the player and the gaming backend provider.

The game stream provider(s) generally provides the game server with one or more video streams of gaming events such as: the spin of a roulette wheel, the drawing of one or more BINGO numbers, or the deal of a hand of blackjack.

In particular embodiments, the gaming backend provider(s) does one or more of: (1) handles the actual monetary transaction based on a report from the server as to if the player or the "house" won the round/game; (2) holds the players gaming account and credit information; (3) determines the winner of the game, based on information provided by the server.

Other Embodiments

In some embodiments, (such as that discussed in U.S. Provisional Application No. 60/568,707) the gaming backend provider(s) determines the outcome of the game(s) (win/lose) instead of the server doing the determination. Server auditing can be limited to keeping a log of the video streams and the "result" of the stream (e.g., the value of the ball for each spin of a roulette wheel, the value of a card dealt, or the value of a BINGO ball, etc.). In this case an audit would be run by the gaming backend provider, and the provider would also have to keep an audit trail if an audit function was desired.

In further embodiments, a game stream provider may also be a gaming backend provider, such a case would be a Casino that uses a game server to provide 3$^{rd}$ party assurance of it's fairness.

In specific embodiments, all interactions between the player and both the game stream provider and the gaming backend provider are handled at least in part through a game server according to the invention. Also messages for things like player to player chat if provides "go through" the server only, and are normally transparent to both the game stream provider and the gaming backend provider.

In further embodiments, the actual monetary transaction is between the player and the gaming backend provider; and a game server system according to the invention only acts as a conduit for messages. In further embodiments, a server according to the invention also determines the result of a chance event, such as the actual value dealt, drawn, rolled, etc.

In specific embodiments of the invention, a variety of means may be used to determine the results of a chance event and/or to determine a winner of a game. As an example using roulette, determining chance event results can include one or more of: (1) having an agent (person) "call" the final slot a roulette ball lands in; (2) using an automated detection technique to determine the slot, such as: (a) a wheel where each slot has a "ball detector" associated with it, such as an electronic and/or weight based detector (b) using computer pattern recognition to make the determination from a video image of the wheel. Further, multiple means may be checked against each other for further verification of the result. In some embodiments, the game stream itself may have appended to it the result of the event, e.g., a "film" of a roulette wheel spin has appended to it an indicator of what the winning number was, so that the server verify the integrity of the stream and then removes and decodes the winning number information.

In various embodiments, the connections between the game server and both the game stream provider and the gaming backend provider maybe standard Internet links or may be some form of "direct" (non-internet) links, such as leased lines and/or a satellite link.

In a further optional embodiment, a player can use an optional "multi-play" function that allows the player to enter multiple different games at once, optionally using the same bets mirrored onto each games. For example, if there a four different roulette video streams available, for example from four different live wheels or four different pre-recorded wheel spins, the player can place one bet, which is then used as play for each game. Any number of options of play are possible, for example allowing a player to bet different minimums on each of four wheels, but using the same number, or allowing a player to make various hybrid or derivative bets, for example a bet that the next numbers on the four wheels will be all black, or all red, or evenly divided (2 black and 2 red). Any number of other hybrid or derivative bets will be apparent to those of skill in the art having access to the teachings of this application. Additionally the player could have a simple "script" to determine the betting: for example "if the last 2 balls were red the bet on black, otherwise bet on red" or "if 23 won in the last roll then bet on 18, otherwise bet on 23."

A player according to specific embodiments can also be enabled to play two games, where the first is mirrored onto two other games and the second is mirrored on to 4 games for a total of 8 games going at once. A player can also have different games "open" at one time so a player could have (using the "multi-play" function) 4 games of roulette, a game of blackjack and a couple of bingo games with a total of say 8 cards all going on at once.

In various implementations, RVG can offer multiple "casinos" (Game stream providers) each of which will offer multiple games.

In other embodiments, player validation can be performed by the RVG module or external to it, for example, by an (on-line) casino that performs validation and by allowing the player access to RVG implies that the player is authorized or passes explicit authorization to RVG.

In some embodiments, RVG may provide the GUI for each game (and the gaming backend provider will have to use it, or be compatable with it, as the case maybe). While this is expected to be the standard case it is not required, the only requirement is that the outside party's GUI provide the proper information to RVG. Information passed by RVG to and from the users machine is generally done via a standard set of RVG "front-end" APIs, which maybe intercepted and handled by the on-line casino, if it wishes to have a proprietary user interface.

Typically, for security reasons, RVG sessions will be done as https, instead of http, so as to make use of the built-in security measures. This is of course not intended to be the only security measure, other measures such as change (error) detection on the information being passed between the GUI running on the players system and the back-end will be used additionally "films" may include a checksum frame, which would be hidden from view. Other security measures are known in the art and may also be used.

In some preferred embodiments, a person performs the card dealing, die rolling, etc., to provide a sense of trustworthiness of the "deal/roll" and also to provide players the sense of participating in a live game, rather than depending on a computer generated outcome. However, where desired, computer or computer-mechanical machines that are just as trustworthy can be used to deal cards, roll dice, or pick or activate balls. In this case it would be entirely in keeping with RVGs concept of trusted 3$^{rd}$ party to use those machines instead of people, preferably letting a player know if a person or a machine is "running" the table. Further before deploying the machines RVG would preferentially attempt to verify that they deal/roll in a truly random manor, and would certify any such test results.

4. Game Server Enabled Bingo Example

As a further example, the invention may be used to enable various Bingo-style games. In a specific example embodiment, such Bingo is different from "American standard" bingo in one or more of the following ways.

While a standard 5×5 BINGO card is may be used, a number of changes may be enabled. First, while a "pre-printed" card maybe purchased, the player can select where the "Free Space" is (swap the "Free space" with another space) and optionally for an additional charge may elect to move the "Free Space" within the first N balls played (where N is a small number determined by the house, and the additional charge may be dependant on the number of balls played so far, with the maximum charge applied at the Nth ball) (note moving the "Free Space" can't result in an immediate "BINGO", i.e. win).

Alternatively the player can design (select the numbers and placement) for their own cards (subject to the normal bingo card column number range limits), as an alternative to buying "preprinted" ones from the house. An additional option would allow the player to waive the column restrictions and select any 24 different numbers for their card, either randomly or hand placed.

Another variation on the above would allow the purchase of one or possibly more additional "free" spaces for a fee dependent on the number and possibly the placement of the said "free" spaces. Note: that for buying additional free squares on a card; where the square is affects the odds differently and is a function of what the winning pattern is supposed to be. Therefore, the cost of adding a new "free" square may vary, based on the "value-added" by the new "free" square.

A card may be saved and entered into multiple games, and/or entered into a game multiple times. Also a saved card can be lent or "rented" to another player for use in a game, note this is subject to the restriction that only one player can play a card in a game, but doesn't restrict making a copy of a card as above. The cost of entry into a game maybe higher for a card that has been customized, and the additional cost may vary depending on the degree of customization. The amount of the extra charge may vary from game to game, and can range from games where there is no extra charge for using customized cards, to games where they are not allowed.

As a further option, a player may buy either a "semi-exclusive" on a card from the house; this insures that no one else (including custom cards) can have the exact same card in the game (an example definition: matching up to 4 rows and 4 columns is allowed, i.e. the cards must differ in at least one number position). Or a player may buy a "full-exclusive" which insures, for example, that no other card in the game will match this card on more then 1 row and 1 column. Note it is possible for the house to make a card "unique" in which case no card in the game will match any row or column of the "unique" card. In the case of a conflict the first purchase at a level "wins", i.e. if you have bought a "semi-exclusive" on a card from the house and another player buys a "full-exclusive" that would conflict with your card then you will be given the option of either upgrading to "full-exclusive" (only if you are the earliest entered card) or changing your card so it doesn't conflict or lastly withdrawing from the game with a full refund. An alternative would be to allow a "shared full-exclusive" where prior cardholders who elect to upgrade are not eliminated, but new entries are blocked.

A player may play more than one copy of a card to be played in the same game, for example a player may elect to play their custom "lucky" card 10 times in one game, in which case the fee can vary from, a discount on 10×the normal cost of entry, to a surcharge over the normal cost.

As a further options, balls can be played in either pairs or triplets and multiple winners are allowed, with different number sequences. As opposed to single ball play where all winners must be the same (i.e. make bingo on the given ball). Players can elect to either mark the card themselves or have the computer do it, but the computer will always keep track of if a player has won and will alert them (and the house) that they are a winner (if played with out a computer, say for example in a normal bingo hall, then this would not be true). I.e. where possible the host system determines the winner(s) of the game automatically, in order to make all players "equal".

Note: this is not intended to limit the applicability of these innovations to "European Standard" bingo or other formats, the required adjustments will be clear to one skilled in the art.

5. Further Card Game Embodiments

In a particular embodiment, a dealing machine can read the cards (for example the cards could be OCR marked on the face for ease of reading) as they are dealt and send the "card stream" up to the RVG system along with the "Film." This option is most easily implemented for stud-type card games or other fixed number card games.

For draw games (such as 5 card draw poker or 7 card stud where a player may fold before getting all 7 cards, thus making the number of cards per player variable), further techniques are employed. The reason for this has to do with the fact that stud type games have a fixed deal (i.e. the number of cards dealt to a player) per player, while draw games have a variable deal (note the terms draw and hit are used interchangeably here as in both cases the player gets one or more new cards). Note that the same technology allows the deal to be used for multiple games, say a deal could be used for 7 card stud, blackjack, 5 draw poker and texas-holdem all "at the same time".

For example, using a 7 seat blackjack table with 70 players playing on it according to specific embodiments of the invention, assuming 10 players per seat, the invention manages 10 virtual tables from the one real table. In the case of a pure chance game (such as stud) the invention just deals out the cards and everyone bets; folds do not affect the deal and there are no draws. With draw games (or fold games such as 7 card stud), the card(s) dealt depend on if one or more prior player folded or drew. In this case, each virtual table is handled separately and independently from each other. This is done by dealing out the entire deck (or possibly two decks) or (at least) enough cards to handle the worst-case deal. Then each table is dealt by the system from an "exact copy" of the single deck. Thus, one deal handles an effectively unlimited number of virtual tables as the sequence from that deal is supplied to each virtual table and is dealt to players as needed for that virtual table.

In this case, according to specific embodiments of the invention, the game video provided is a mockup of a real deal, composed from snips of each of the 52 cards being dealt separately with the program moving the card from the spot it's dealt to into the players "hand" (optionally separate starting clips could be shot of the first two cards per player for from 1 to the maximum number of players at a table). These snippets (and optionally clips) would be joined together to make the final film at either a server or a client and both the virtual deck (or part of a deck) and the play would be logged by the game server to allow later replay for checking purposes.

Black Jack Virtual Deck Example

FIG. 3A-B illustrate operation of a blackjack game presented to a player according to specific embodiments of the present invention. FIG. 3A shows two different tables each with three players and a dealer are shown at both table the initial cards are the same: player 1 gets 19 (A-H & 8-H), player 2 gets 13 (T-S and 3-C), player 3 gets 17 (T-C and 7-H), while the dealer gets 12 (2-D and K-H) with 2 showing.

In this example, the initial deal for the two tables is the same, but the play differs in that player 2 at table 1 "stands" on their 13, while the player at table 2 takes a card, this puts the two tables out of sync. As now when the dealer takes a card, at table 1 the dealer getting the T-D totals 22 and busts, so all three players win. While at table 2 player 2 gets the T-D totals 23 and so busts, and the dealer gets the next card the 6-H for a total of 18. So a table 1 all three players win, while at table 2 only player 1 wins (player 2 busted and player 3's 17 lost to dealers 18). It should be clear to one at this point that if table 1 had 3 players but table 3 had 2 players then again the deal would change, as shown in FIG. 3B.

Initially at table 3 the deal would be as follows: player 1 would get 3/13 (A-H and 2-D), and player 2 would get 18 (T-S and 8-H), while the dealer would get 10 (7-H and 3-C); player 1 elects to draw two cards (the T-C and the K-C) and busts, while the dealer draws the T-D for 20. So at table 1 all players won and at table 2 all players lost.

Thus, in specific embodiments, the present invention can in this example provide three different tables with different plays and results from one captured and stored deal. Note that assuming a 5 card limit (3 draws maximum per player) and up to 3 players per table, than the virtual deck only needs to be at most the top 20 cards of the deck. (4*5=20). It will be clear to one versed in the art that this same approach is applicable to any other variable number of cards game, such as the poker games 7 card stud and 5 card draw.

Also note again that any player (or "dealers") at any of the tables would not only see the film of the game, but can also be shown see the entire virtual (partial) deck or deal at the end of game play, with the display of the virtual deck optionally annotated as to who got which cards.

6. Dice or Craps Example
Programmatically Identifying the Value of Rolled Dice on a Fixed Background Dice games such as Craps have a player throw dice to determine turns and outcomes of the game. When it is desired to have an electronic record or display of outcomes, one means is using a human operator to enter values. However, according to specific embodiments, it may be valuable to have either a programmatic double check or just have one or more different programs do the value determination. The ability to audit the results of a game (e.g., a specific die roll in craps or a single hand in blackjack for example) is also a further benefit to automatic determination of dice or card results.

In this example, the Craps table can be understood as composed of three different layers. First is a static image of the bare table. Overlaid on that is the betting layer ("places" the bets on the table image). At the very top is the roll layer which is the dice being rolled on an empty Craps table (or equivalent). In the real world both on-line and local (i.e. at the table) players can play, but only local players can throw the dice. For local players the difference in the preferred embodiment is they enter their bets via computer, same as the on-line player. In another embodiment, bets could either be recorded by a dealer (using a computer, and having "multiple-logins" one per local player) or actually placed on the table then either computer recognized and converted to on-line bets or recorded by a dealer, who would also remove the real chips from the table after recording the corresponding bets. Note in the case of removing the real chips this would preferentially not be seen by an on-line player, and would add a phase between the end of betting and the throw of the dice.

As the previous implies, there are a number of phases to a "turn" in Craps: first is the betting phase, normally the second phase is the throw of the dice, and the third and final phase is settling the bets. With the final bets configuration after the bets are settled being the starting point for the betting overlay of the next "turn". For simplicity, the discussion is directed to a virtual table where all players are located on one half of the table, although extrapolation to using both sides should be clear to one skilled in the art. Additionally there are many craps table layouts, the one shown is for illustrative purposes only and is not intended to be limiting.

Thus, for the purposes of this discussion a Craps table has three sections: right, middle and left, with the right and left similar to each other as shown in FIG. 4. Note some casino's use asymmetric layouts where for example circles with the numbers 2 to 12 are in them and they form a full or partial circle around the main betting area, the simplest solution in accordance with this example is to put all such circles on the portion of the table used for betting, this can be done either on a real table or by manipulating the image of the betting section of the real table and then using a real table that doesn't have the asymmetry.

Details of an Example Craps GUI

Figure 4A:
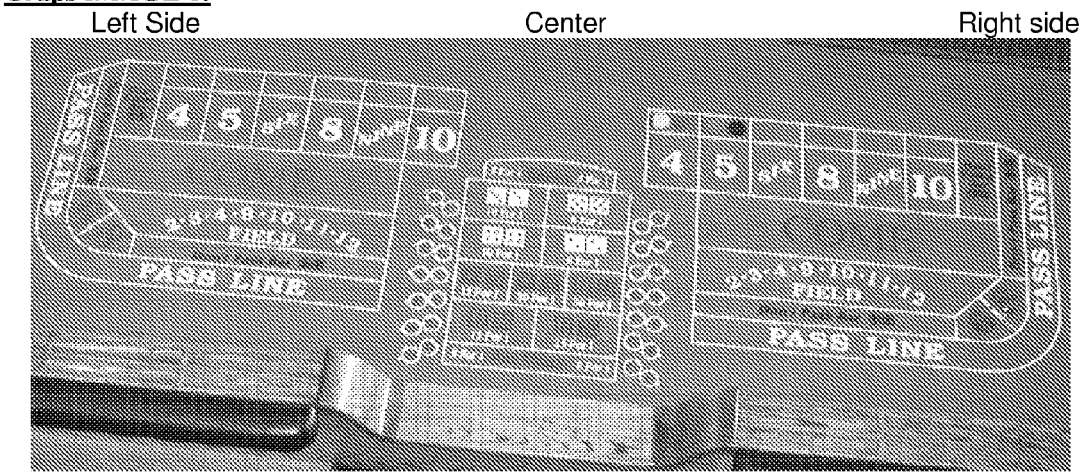
FIG. 4A-B illustrate two views of a craps table illustrating display of a craps game according to specific embodiments of the present invention.
Figure 4B:
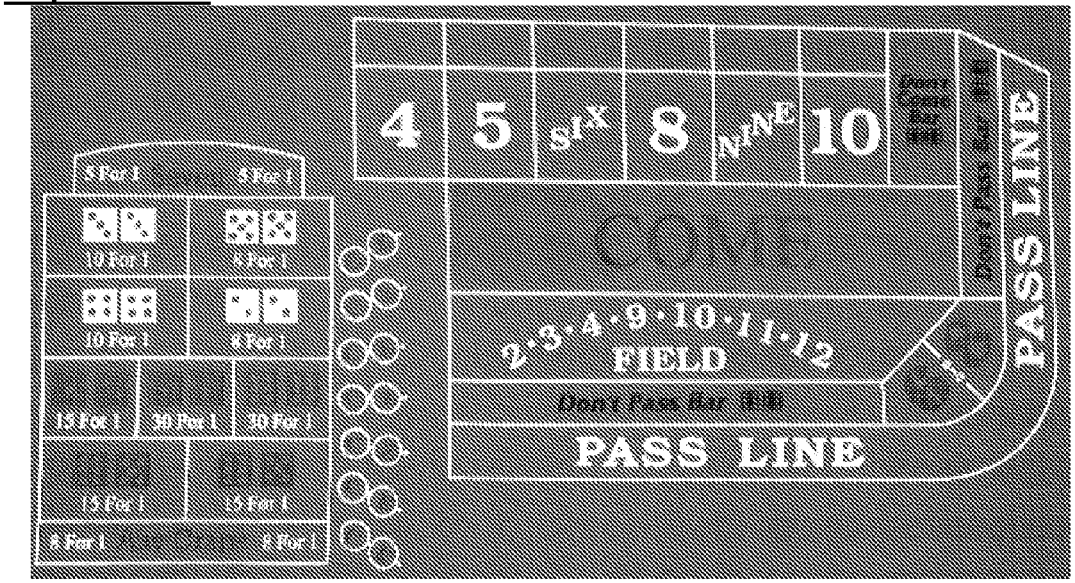

FIG. 4A-B illustrate two views of a craps table illustrating display of a craps game according to specific embodiments of the present invention. As can be seen the left side extends from the end of the table (cropped off) to the 10 box. The center starts below the 10 box and extends to below the 4 box of the right side. And the right side starts at the 4 box above the center and extends to the end of the table (cropped off). For our purposes bets are only placed on the right and center portions of the table, never on the left side. Also note the center section is cropped. This is the portion of the table where the bets for all players on the right side are placed. A player on the right side throwing the dice throws them such that they must bounce off the left wall and not leave the table area to be a legal throw.

For the preferred embodiment the effective illumination is straight down to minimize shadows, and local players are on the left side of the table, while their bets appear on the right side, which is where the on-line players are "located", thus the dice will always end up in the on-line players betting area. While this does limit the number of on-line players at a table, the processes ability to create an unlimited number of virtual tables makes up for it. This makes it possible to always have the dice end up in the on-line players betting area, where the on-line players can see the results directly.

An example actual method whereby the dice are recognized is as follows: (1) Again the table is divided into three sections; first is the person throwing section this area includes the person throwing the dice and about 3 feet of the left side of the table. Then there is a "blind" section that starts at the end of the person throwing section and got up to the start of the betting section as defined before. At least one camera is required mounted at 90 degrees to betting section of the table (i.e. directly above it), this is preferably a high-resolution digital still camera (at least 6 MP, with good zoom and focus) with multi-shot ability (should be about 50 or more frames in under 3 seconds, i.e. at least 15 fps at a lower resolution, such as 640×480) otherwise a digital movie camera is required in addition.

The basic idea is that a standard movie is shot of the person throwing the dice, at the same time that the person starts to throw the dice (indicated in any of a number of means, such as clicking a button with their other hand) the multi-shot camera starts shooting, each image (cropping maybe required, at any or all of the points in this sequence) has an empty table subtracted from it so any pixels that have not changed in this from the background become 0's. all pixels that are 0's are then indicated as transparent, leaving only the dice as opaque. This "dice only" image can be compressed via various methods, such as run-length encoding, and sent to the user. Once the dice have stopped moving for about 1 second (i.e. subtract each "dice only" image from the prior one, and when 15 or more frames of 0's appear, the dice have stopped). Now take a high resolution shot of the betting area and subtract from it an equivalent shot of an empty betting area the result is the dice at rest, with all other pixels being 0's. After each frame is calculated the frame maybe compressed by any of a number of standard means, such as run length encoding, this results in a very small clip for transmission with little overhead required to uncompress the clip. FIG. 5 is a flow chart illustrating film clip processing according to specific embodiments of the present invention.

At the players end the dice roll clip is uncompressed frame by frame and each frame overlaid on either the empty table image or if preferred the empty table image overlaid with the betting layer on top (and the dice layer is then overlaid on top of the combined images) Note that at this point while the die roll is going on the betting layer is static.

Figure 6:
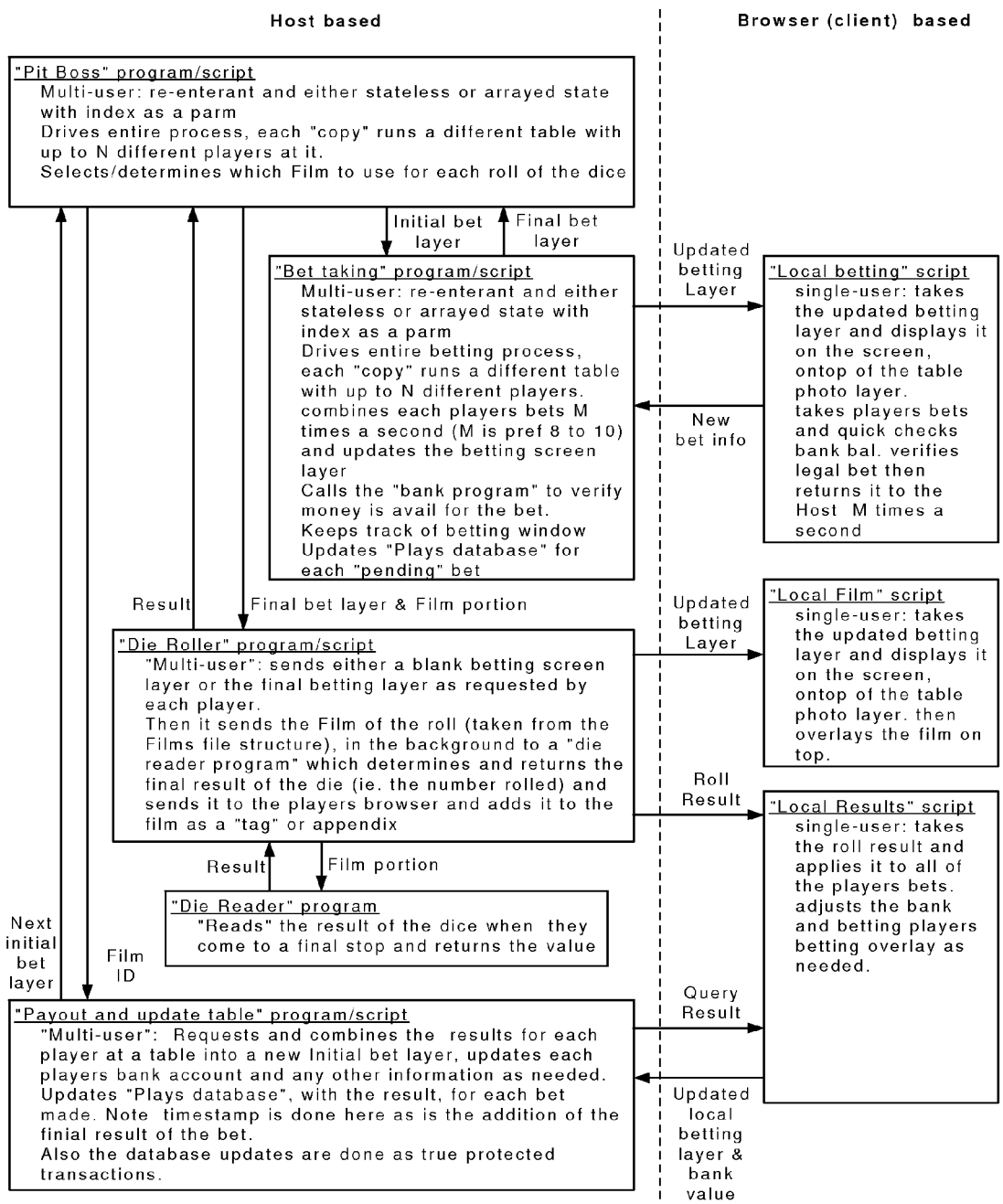
FIG. 6 illustrates logic modules of a client server system according to specific embodiments of the present invention.

FIG. 6 illustrates logic modules of a client server system according to specific embodiments of the present invention. This figure shows an example of one way the system could work for driving the graphical user interface (GUI). This example uses the approach of sending image layers from the host to the client, as mention elsewhere other approaches are possible and maybe preferable: such as sending a change list of images to be removed and added to the layer, with the work of building the actual image being done on the client side, unlike the example where the image is built on the host side. Building the image on the client side has the advantage of requiring less data to be transmitted and less work by the host at the cost of increasing the client workload.

Also note that optionally even the roll film itself could be done as a set of layer change lists instead of a transmission of multiple images. Further note that most calculating type functions can be done on either side so the functions of the "local Results" script, for example could be performed on the host side and just a display update list sent to the client. The final display function of course will always remain on the client side.

7. Further Craps Example

FIG. 7A-E illustrate various embodiments of a graphical user interface illustrating game play of a virtual craps game according to specific embodiments of the present invention. In a further example GUI for a virtualized Craps game, 4 betters per virtual table are generally supported, but by something as simple as changing the size of the chips (shrink them by 25%) 5 betters could be handled on one table. Other methods of extending the number of bettors should be apparent to the reader, and while this example uses only half the board and the number of bettors is determined by the size of the numbers boxes, other examples will be apparent to the reader, things such as using the whole board or increasing the size of the numbers boxes.

For an example implementation, a simplification has been made in only allowing one of the four types of number bets per number: Place win, Buy, Place lose or Lay. The reason is that the 4 bets are mutually exclusive while it is possible to have placed more then one of them on a number at the same time, the net effect of such a move is to pay the house more money, so the invention simplifies by only allowing one of the four bets per number. Alternatives which would allow all four bet types, include a stack with a lamer labeled "CPLX" or just the last bet type placed and on mouse-over a user sees the actual bets in a "popup", other alternatives will be occur to one skilled in the art given this information.

FIG. 7A "GUI Example" shows a basic layout of the user interface; setup for 4 players and in the center section 2 "shills"; note there is space for the "shills" to bet everywhere but the numbers boxes, if so desired. FIG. 7B "numbers bar betting layout" page shows the division of space on the craps table for the numbers box betting.

A number of sample options can be provided that are player programmable to assist in betting and play. Example include: (1) Harvesting of place/buy/lay bets (a) Cashout on win; (b) Take winnings on even wins, stack on odd wins (i.e. stack on 1st & 3rd, take on 2nd & 4th); (c) Take winnings on odd wins, stack on even wins (i.e. take on 1st & 3rd, stack on 2nd & 4th); (d) Stack winnings on 1st win, take on all others; (e)Stack winnings on 2nd win, take on all others. (2) Adjust bet amout to odds (a) Don't round (b) Round down (e.g., a bet of $25 on a Placed 6 would be adjusted to $24 to be divisable by 6); (c) Round up (e.g., a bet of $25 on a Placed 6 would be adjusted to $30 to be divisable by 6). (3) Other:(a)Table of 1 roll bets, with a "let it ride" option, also optionally an number of throws to ride; (b) Automatically place pass line odds of (1×, 2×,3×, etc) if a pass line bet is made (c) Automatically place Place number bets on 6 & 8 if a 4 or 10 is established (and amount to place). In a typical embodiment, a secondary screen linked off the main screen would allow setting of the various options to assist the player in all aspects of betting and playing.

Figure 7C:
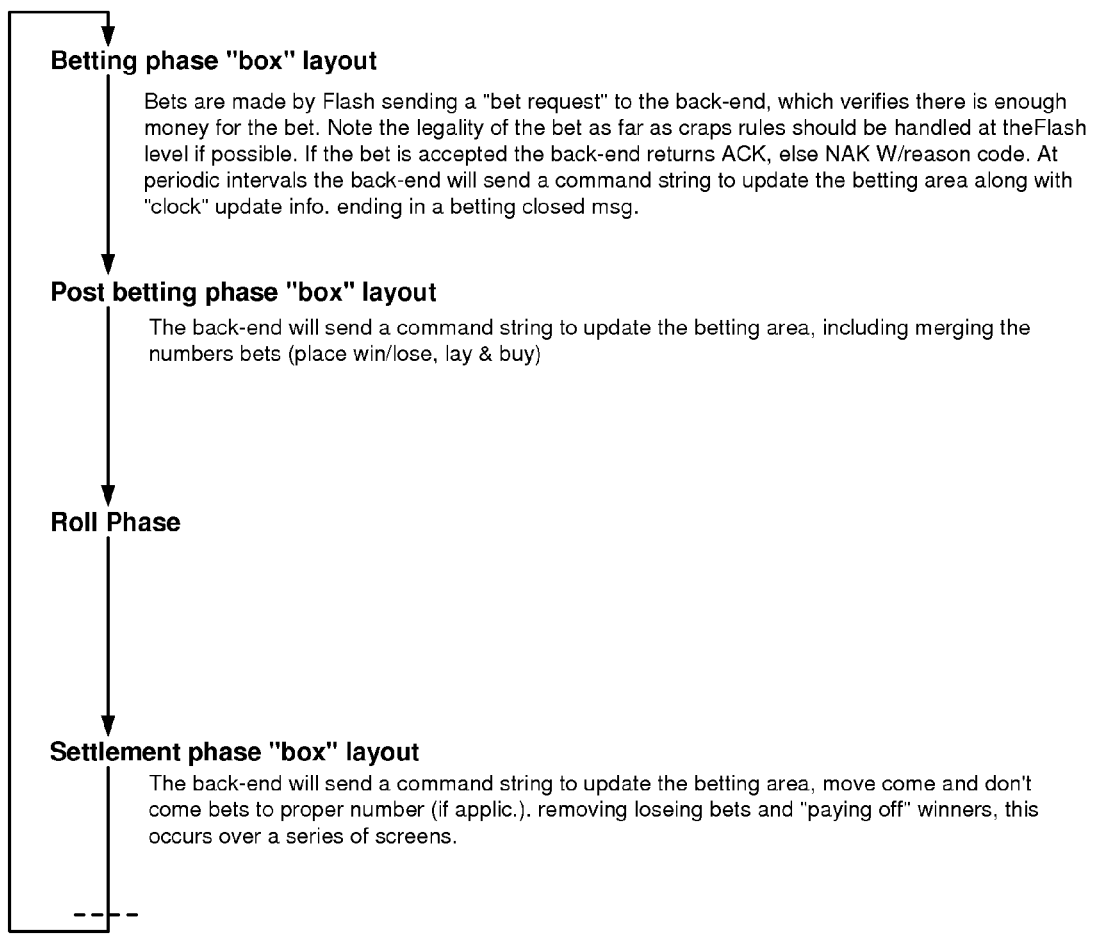
Figure 7D:
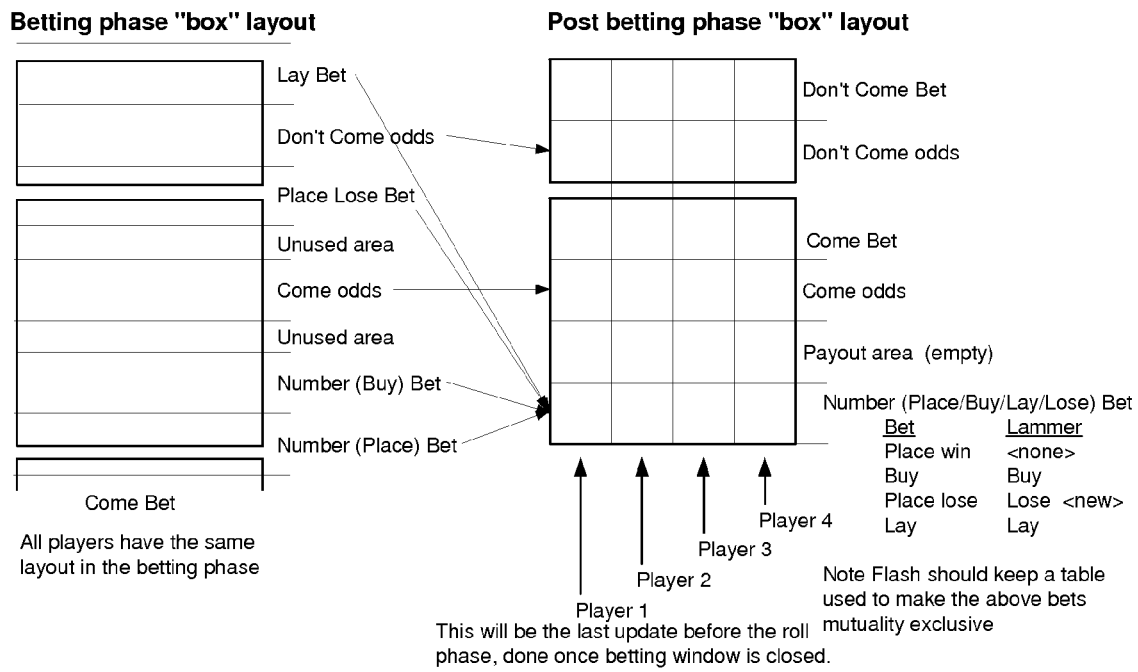
Figure 7E:
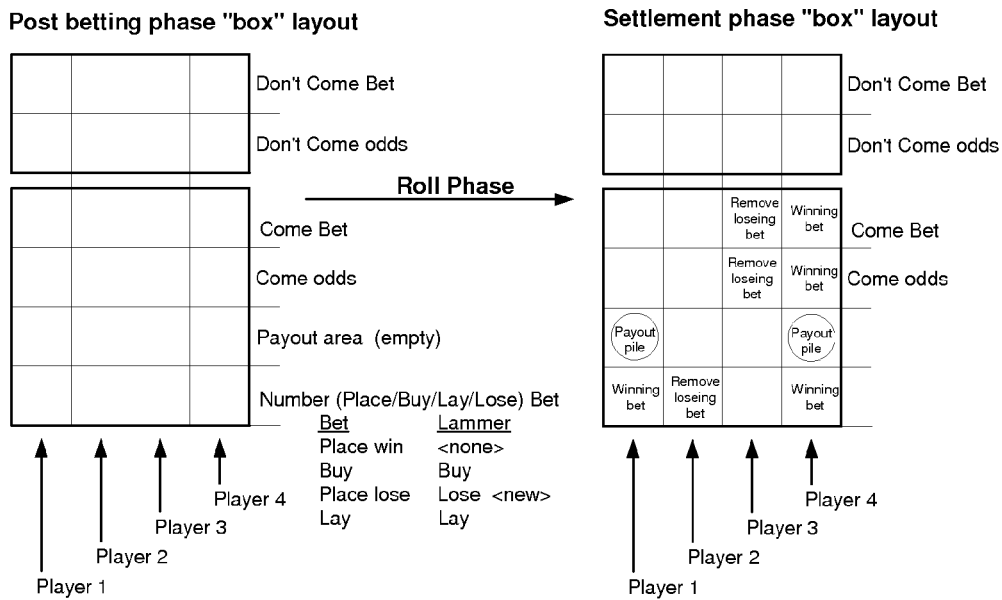

FIG. 7C-E can be understood as follows. FIG. 7C "number box flow P1" gives a example action flow for the phases of a single roll of the dice. FIG. 7D "number box flow P2" and FIG. 7E "number box flow P3" show how the betting configuration of a numbers box in the betting phase, converts into actual bets displayed, post-betting and then into the actual settlement in the settlement phase.

8. Roulette GUI Example

Figure 8A:
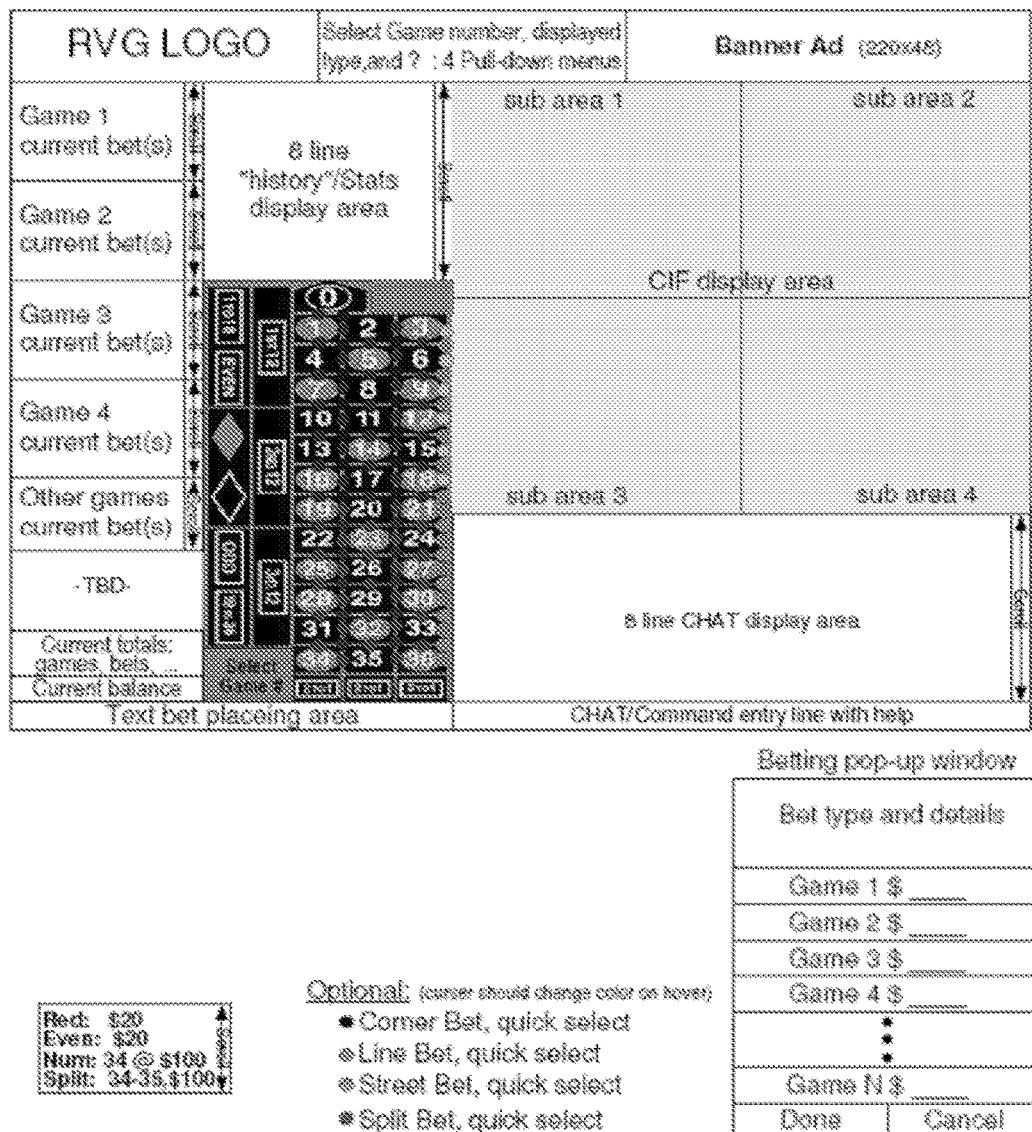
FIG. 8A-C illustrate various embodiments of a graphical user interface illustrating game play of various roulette based games according to specific embodiments of the present invention.
Figure 8B:
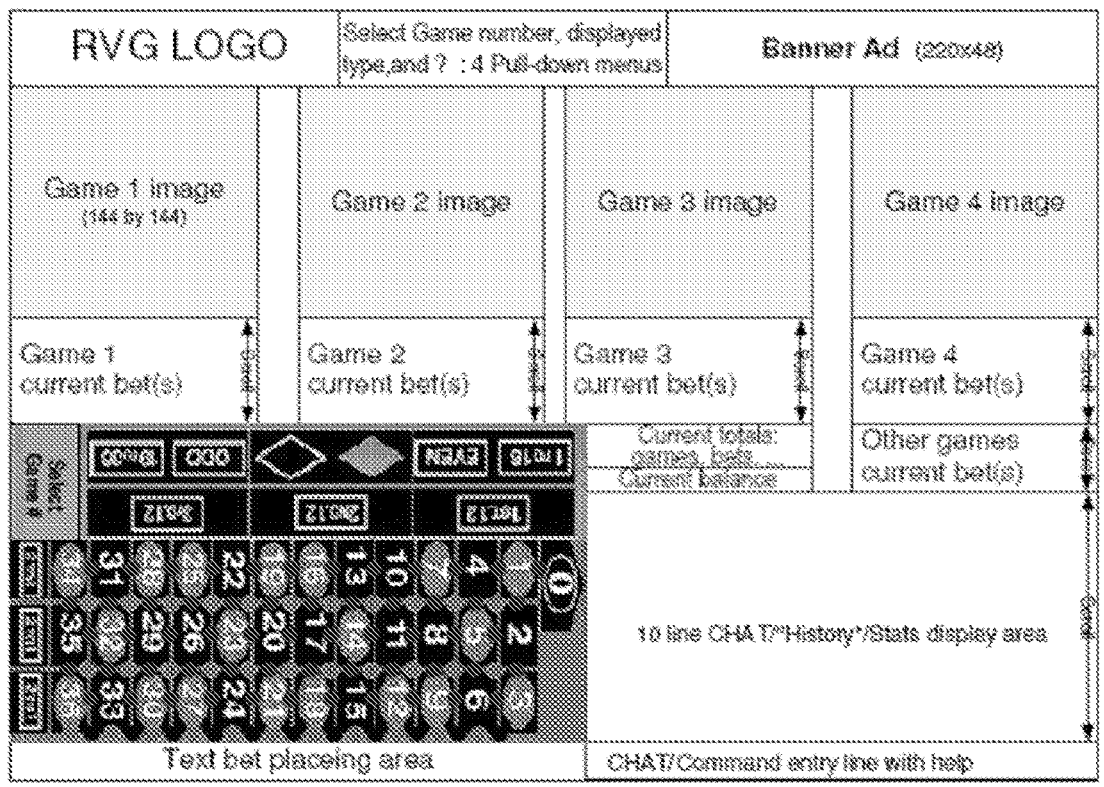
Figure 8C:
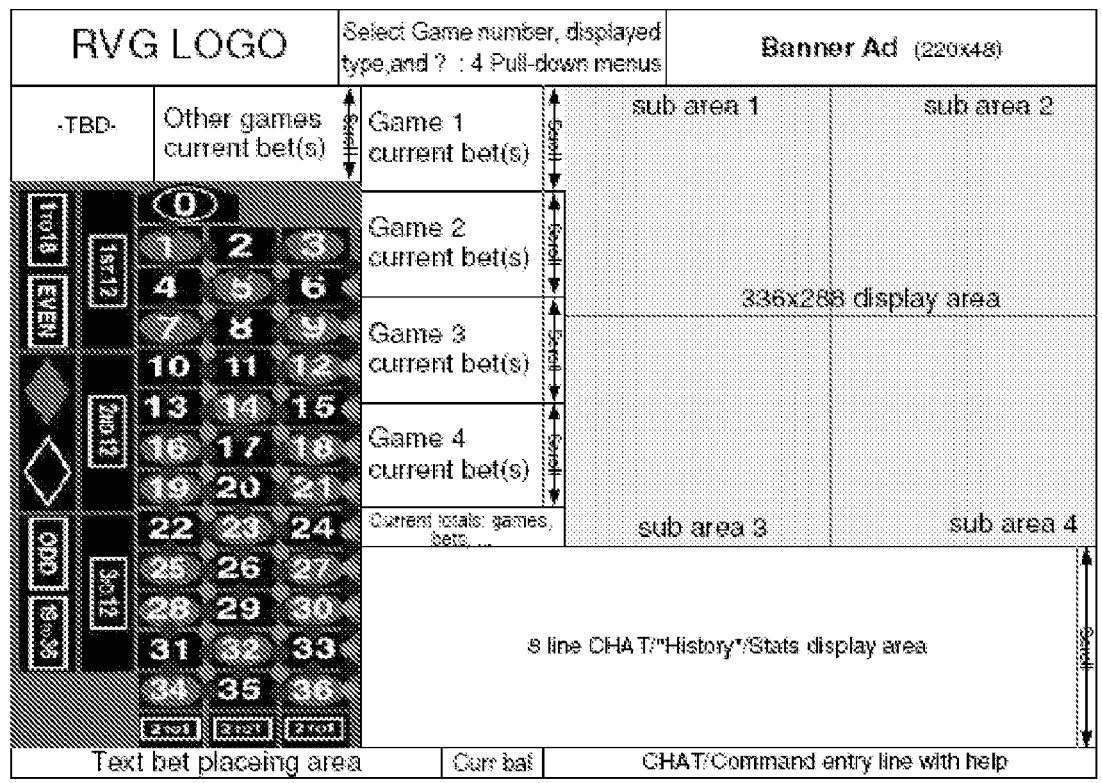

FIG. 8A-C illustrate various embodiments of a graphical user interface illustrating game play of various roulette based games according to specific embodiments of the present invention. In these figures, which are intended as examples of particular embodiments, a user can left-click on any active spot on the roulette table image map to bring-up a betting pop-up window as shown that allow a user to enter the amount for a bet. As an example, types of bets provided for may include Red, Black, Odd, Even, Low, High, Columns, Dozens, Straight-up Bets, Split Bets, Street Bets, Line Bets, Corner Bets, and Five (four) Number Bets, etc. Any valid combos, can be selected by shift-left-clicking the numbers on the table image. In the figures, the game area and sub area windows indicate regions where film clips showing real game action can be presented as described herein with regards to various embodiments.

9. Adding-On Game Server Gaming

In further embodiments, RVG gaming can be added to an existing video gaming system (or any other fixed purpose video system) with little or no hardware modification and some software/firmware modification. Additionally a purely in-house (e.g., with-in one or more casinos typically owned by a company, or multiple companies under a stream sharing agreement) system is described that provides the benefits of an RVG type system, but is local to the casino (or a central company owned facility), except for the video feed which may also come from an outside source (i.e. the stream sharing agreement), note that this approach lacks the detached watcher creditability of an RVG type system, and replaces it with the creditability of the "house". One important point to mention is that real casinos already bring in live video feeds for things like betting on horse races, baseball games, etc. This ability could also be provided as an extension to the gaming machine software/firmware modifications.

Figure 2:
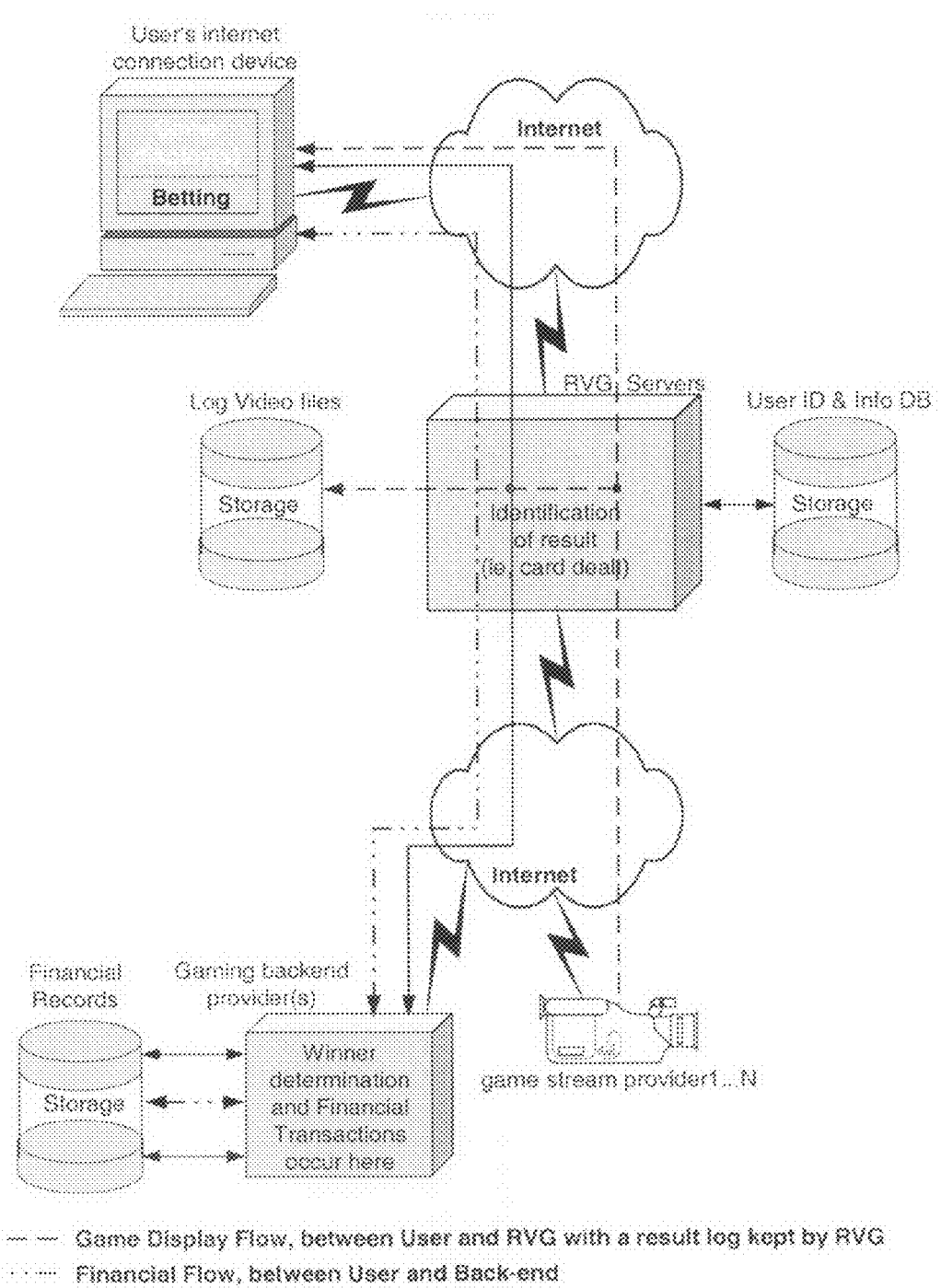
FIG. 2 is a block diagram illustrating a real video gaming server having a video clip database and an optional user id database and communicating a player at one interface and a gambling backend provider on another interface according to specific embodiments of the invention.

Payments and payouts would be handled at the local machine (if possible), an example of this would be the player has an account with the casino and funds move through that account (maybe in the form of a card, such as: credit, debit, smart, etc., i.e. no "real" money handling is then required at the local machine) instead of by the previously disclosed on-line processing; as a gaming machine in a casino is already tied into the casinos system, see FIGS. 1 and 2. In this case if RVG is used, it only needs to provide the video feed, audit and other non-monetary functions as previously disclosed. Note that if RVG is used the bets and results are still recorded by RVG and so either the actual messages (this is the standard RVG approach) or auditable copies of them must go through RVG. If the alternative of an "in-house" system is used then the "house" would provide either at each individual casino or at one or more sites the auditing functionality of the RVG type system, which would be accessible in the same (or similar) manner as on an RVG system for the same local machine. From hereon in we will only refer to the "in-house" system where it would differ in a way that would not be clear to one skilled in the art.

Video Slot Machine

For example: for a video slot machine, which is normally touch-screen based (although some machines maybe mixed real and on-screen buttons, note in this case the meaning of some real buttons maybe changed in RVG mode) there would be a few extra on-screen "buttons" added firstly a "enter RVG mode" button would be added to the standard screen, which if pressed would switch out of dedicated slot machine mode and into an extended mode that would split the screen in to a number of parts, say for example the standard slot machine would be the top third (or half, depending on the resolution) of the screen, while the rest would be one or more RVG windows. Note that if the screen is not "big enough" to split (or the casino or machine manufacturer doesn't like/wish to support split-screen mode) then the entire screen would become a single "RVG window". An RVG window would have the same functionality as a normal "full screen" RVG system (subject to the possibility of changes in appearance, such as: reformatting and/or adding scroll bars, etc due to differences in "window size" from a stand-alone RVG display) as explained in the prior applications.

Note that the specifics of the actual screen design for RVG mode in this type of system is dependent on the type of base game (i.e. slot machine, poker, etc) and the actual resolution of the display, thus there is no one preferred layout and the best layout can vary from one type of video slot machine to another and will of course vary based on the game type (the same layout used for craps would not expected to be the best for Roulette or Blackjack). Further different casinos or gaming machine vendors may want specific customizations which can affect the layout of some or all games.

Additionally, the user could be restricted to only those games available in the casino they are in or a related one; i.e. someone playing in a RVG window at a Harrahs casino could be restricted to those RVG games that have originated at any of the Harrahs casinos or could be able to have "open" access for a small overhead fee (this would allow Harrahs to make the same money say 3% on the average as if you played their games). The other soft buttons would only be part of the RVG windows and would include a "return to slots only mode" button.

In further embodiments, an RVG window would not have to be restricted to the same bet amounts of the "host" machine; i.e. a player on a quarter video slot machine would not be restricted to quarter bets in the RVG windows. So the player could be betting quarters on the slot machine and playing on a craps table in dollars at the same time (or just playing craps in dollars if split screen mode is not supported). Also the reverse is true, this system would allow a player at a nickel slot machine to bet in nickels on a $10 minimum bet craps table. Likewise, the betting amount at the real table is not required to be the same for the RVG window.

This last feature may be effectively employed, according to specific embodiments of the invention, to allow players to participate at a "high-stakes table," for example, if a celebrity is playing at a table in the casino, the casino may set the minimum bet at $1000 (when playing at the table) but someone playing via RVG either a "traditional" standalone screen or a RVG window would not be subject to that limitation and could still bet in their normal amounts; again note this applies to all types of RVG gaming (stand-alone or add-on). Of course all this applies to the "in-house" form too, with the difference that the stream sharing is directly between different "houses", without the involvement of a third party.

Also note that the amount of the overhead fee can vary from destination to destination, so Harrahs may have a reciprocal agreement with the Marriotts chain so there is no fee, and a general agreement of 3% for any "Vegas" casino, but to access an Indian casino could be a 5% fee on some and prohibited on others. In an alternative agreement between Harrahs and Marriotts may be no fee for normal games but 3% when a celebrity is playing at the table, or it maybe that Harrahs sponsors the celebrity and Marriotts kicks in some money to get access to the feed, which is then exclusive to Harrahs and Marriotts casinos only, i.e. a player who is not playing on a Harrahs or Marriotts system would not even know that this feed was available, and even if they knew would not be allowed access.

In the prior examples one should note that along with any other information (such as player ID and amount in "account") passed to RVG the following information is required: the system location, type and owner of the system that the player is playing from, this information only needs to be passed at the start of a session (or if the system moves) not with every bet. I.e. a normal stand-alone RVG system, such as was covered in prior applications would at least indicate, "I am a stand-alone private system in location X", while a add-on system would indicate "I am an add-on system belonging to casino C in location Y".

Given the location and ownership information, which may be geographic or it maybe logical i.e. "I am stand-alone system N at a Harrahs casino", the system number N could then be converted to a location via a table supplied by Harrahs (if the actual location is required). Note that for an "in-house" system the location (if multiple locations) and player information is still required but in a more limited form (i.e. for a Harrahs "in-house" system you need to know which casino and normally which machine, but the only casinos are Harrahs.

There is another type of video gaming machine, which is multimode where at the start the player can select the game to play from a number of options and optionally select the betting denomination. For this type of machine "RVG mode" would be just another initial menu option (along with the standards, such as slot machine or poker). For this type of machine you would get a "standard" RVG screen as per the prior applications (subject to the possibility of changes in appearance, such as: reformatting and/or adding scroll bars, etc due to differences in "screen size") and would play as any other stand-alone RVG system.

Allow pass-through of membership info to "foreign" casinos, i.e. if playing at Harrahs and you "log-into" a game at Peppermill your Peppermill gaming club membership number would automatically be provided by RVG (assuming it was on file with RVG) to the peppermill casino. This allows each casino to track a users betting for determine comps. This pass-through function would apply to all "forms" of RVG: window, full-screen and stand-alone. While this is possible to do with a "in-house" system, it is more likely that the "in-house" system would allow you to select where the (video) feed comes from the actual betting would be "in-house" thus you could be playing at Harrahs on a peppermill feed, and you would get credit for playing at Harrahs, although nothing prevents an agreement providing pass-thru of the gaming credit or an agreement where you would split the credit between the "house" you play at and the "house" that provided the stream.

10. User History Result Query

In further embodiments, the invention addresses an important problem involved with allowing a player (user) to go back and review the results of a prior game, which is that the user may not remember all of the information required to lookup the specific game. So while a user is likely to remember some things: such as the date, type of game played and the bet; they are less likely to remember the exact time (they will often know the approximate time) and which casino they were playing in. Thus, in specific embodiments, the invention may optionally include the following mechanism, a detailed example of which is described herein.

Especially for various embodiments as disclosed herein, where not only can a player be playing more then one game of chance at a time, they may also be in different virtual casinos, so it is possible that in a short period, say 30 minutes, of time a player could play a total of 40 or more games (here a game is defined as a single bet and it's associated result, so someone playing craps each roll of the dice would be treated as a separate game) in say 10 different casinos. While one could brute force review the results of all 40 games this is very inefficient and has a high probability of missing the actual game the user wanted reviewed.

Figure 10:
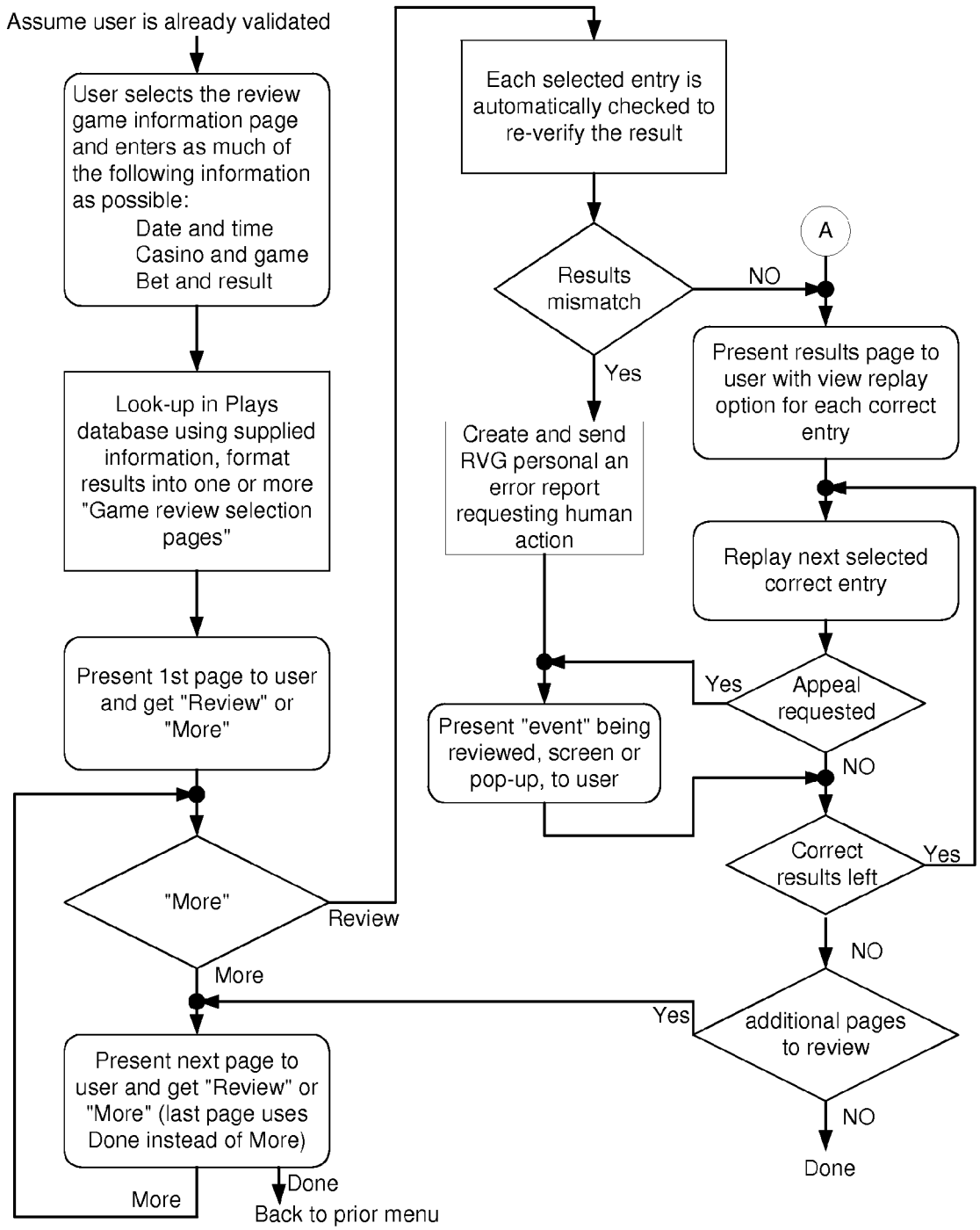
FIG. 10 is a flow chart illustrating a method allowing a user result history query according to specific embodiments of the invention.

Thus, in specific embodiments, the invention provides a better method of selecting the game(s) to be reviewed, reviewing them, and presenting the results to the user, in a manner which takes advantage of the inventions facilities in some embodiments of keeping a full detailed record of each game played. FIG. 10 is a flow chart illustrating a method allowing a user result history query according to specific embodiments of the invention.

Figures 9, 11:
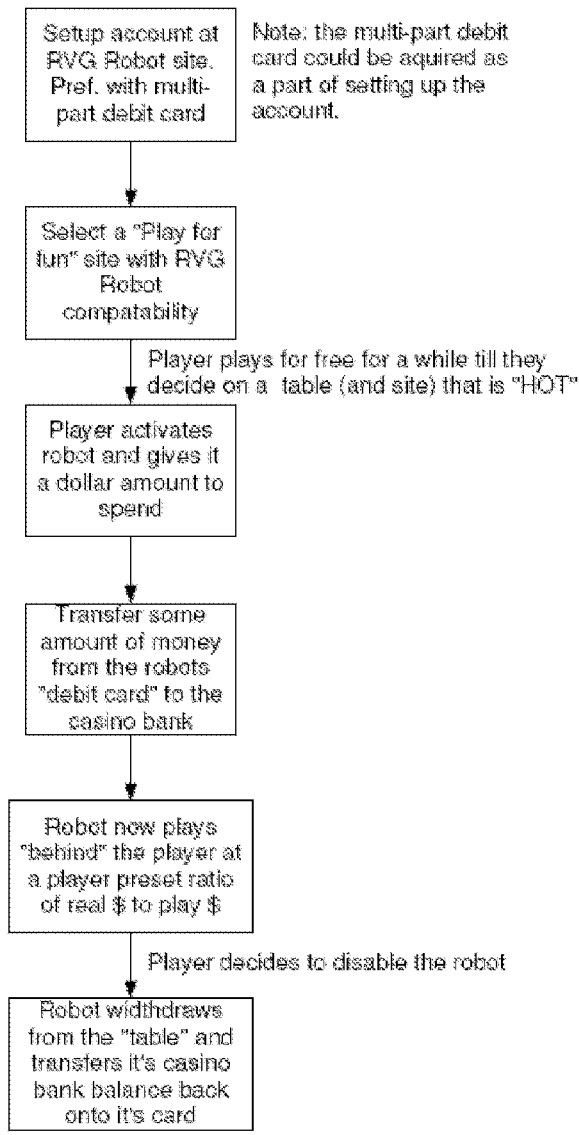
FIG. 9 is a flow chart illustrating a method allowing a "robot" logic process to mirror a for fun on-line game play provided by a game provider in one location with a wager game play provided by a gamer in a different location according to specific embodiments of the invention.
FIG. 11 is a block diagram illustrating a simple example database facilitating user review of games according to specific embodiments of the invention.

FIG. 11 is a block diagram illustrating a simple example database facilitating user review of games according to specific embodiments of the invention. In specific embodiments, three basic data structures are used in the example of the invention, first the User ID Database, which is simply used to verify the identity of the user (and that they are legal) and get the specific user_id value for this user. Then a second database, the Plays Database, converts {user_id, data, time } into a set of pointers in a directory structure called the Films File Structure which holds the recordings of each game (hand of cards or roll of dice, etc.) played: 1 Film per game (and one game per film, for example: one hand of blackjack, 1 roll of the dice in craps or one full deal in Texas holdum). Additionally this database (the second) holds additional information related to the game including the bet(s) and the result. Note that queries into the database are done on a time window basis, for example user specified time +/−10 minutes and so even if the user plays only one game at a time a query will normally return multiple results: i.e. a sample query would be "get all records for user user_id on date DATE between User_time −10 min and User_time +10 minutes where the game played is GAME and bet is BET dollars and result is LOST". Note the 3rd structure is not a database in this example as there is no need for the overhead: i.e. each game will reference 1 and only 1 film.

In further embodiments, the plays database may have any of 4 fields, such as: serial number for fast retrieval, {user_id, date, time, optionally may also the casino and game for ambiguous cases; Film_name & path; "result" holds the result of that game for that player, e.g., Bet on pass ($100) & 9 ($50): lost (crapped out)."In specific embodiments, the table has a many to many relationship, e.g., if a player is playing 6 games at once there could be 60 different entries with the same time and date (i.e. the user won't know the exact time) so they will need to select from a set of "films" maybe +/−10 min from the selected time, thus the table lookup will be ranged on time. And is expected to have multiple matches. In further embodiments, the films file structure may be kept near-line not on-line to reduce the cost, only the current day's transactions (at most) will be "cached" on-line as will the near-line "directory pointers."

This query will normally return multiple matches, if only one case is returned then simply review it as if the user selected "Review" and "Replay" and be done with it. For the normal case the first N of M returned matches are displayed on the screen. The user then selects which selections (for example using JavaScript radio buttons) to be reviewed, for the final set of matches a screen such as the example "Last Page" would be used.

FIG. 12 is a block diagram illustrating example user interfaces for review of games according to specific embodiments of the invention. In particular embodiments, the "Video replay controls" include the standard functions such as start, stop, fast-forward, and rewind; in addition special functions such as (multi) frame step or play first N seconds and last M seconds only.

The reverify result step may consist of (re)running one or more result checking programs or verifying that 2 different prior results reports (from different programs or a person and a program) match; or a combination of the two. Note that while in a "perfect" system this check will always match and is thus unneeded, here we prefer to assume the possibility of an error (a mismatch). If a mismatch is found the program automatically generates a detailed report on the error, such that one or more people can easily review the film for a final result determination. In addition to the automatic generation the player can generate a similar report by requesting an audit of the results of a film. Note: it is up to the implementation to set the policy on charges (if any) for player imitated audits and may range from a charge for each appeal that finds no error to a charge regardless, to a number of free appeals in a time period then charge. Also note that details about charging for player initated appeals are intentionally not in the flow chart, due to the variety of approaches possible. When the report is generated (either type, the only real difference is an optional indication of "who" caused the report to be generated) it is sent preferably by email to one or more human reviewers, optionally via an email dispatching/balancing system as known in the art. Other options in place of email such as simply adding the report programmatically to a to do queue, will be apparent to the user. Note the number of free appeals and charge for overage are determined jointly by the on-line casino and RVG and so can vary between casinos (or even game types within a casino).

In a preferred system the appeal audit pgm (or person(s)) is different from the normal result checker(s), thus yielding a redundant "self audit" ability. When the player finds a real problem, they may be provided a reward of some sort. The Casino can also generate reports from the databases to find information of interest to them such as a player who wins a statistically abnormal number of times, or how busy is a given game type in a given period. Note these are all standard DB queries. Additionally statistics can be generated from the databases as needed, as per the art. There is a fee associated with this activity in the preferred implementation. The expectation is that this would be done using standard SQL queries, possibly with a GUI front-end, but basically a state-of-the-art interface, which maybe customized per casino if needed.

11. Embodiment in a Programmed Information Appliance

FIG. 13 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a user's computer or a fixed media containing logic instructions may reside on a remote server that a user accesses through a communication medium in order to download a program component.

FIG. 13 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

12. Other Embodiments

The invention has now been described with reference to specific embodiments. Other embodiments will be apparent to those of skill in the art. In particular, a user digital information appliance has generally been illustrated as a personal computer. However, the digital computing device is meant to be any information appliance for interacting with a remote data application, and could include such devices as a digitally enabled television, cell phone, personal digital assistant, laboratory or manufacturing equipment, etc. It is understood that the examples and embodiments described herein are for illustrative purposes and that various modifications or changes in light thereof will be suggested by the teachings herein to persons skilled in the art and are to be included within the spirit and purview of this application and scope of the claims.

Furthermore, various different actions can be used to effect a gaming transaction. For example, a voice command may be spoken by the purchaser, a key may be depressed by the purchaser, a button on a client-side scientific device may be depressed by the user, or selection using any pointing device may be effected by the user.

All publications, patents, and patent applications cited herein or filed with this application, including any references filed as part of an Information Disclosure Statement, are incorporated by reference in their entirety.

What is claimed:

1. A computer implemented method of providing a chance events based virtual games with player responsive game play based on real world gaming chance events comprising:
    capturing a results sequence of real world gaming chance events;
    storing said results sequence as digital data at a server computer system, said server computer system having digital storage, a processor, and a communications interface;
    capturing and storing a plurality of video clips of real world gaming chance events at said server computer system;
    providing a virtual game client and graphical user interface on a player electronic gaming system said player electronic gaming system having digital storage, a processor, and a communications interface;
    providing interactive controls in said graphical user interface allowing a player to indicate a chance events based virtual game to play and to make one or more player selections during said virtual game;
    communicating said plurality of video clips from said server computer to said player electronic gaming system;
    communicating said stored results sequence from said server computer to said player electronic gaming system;
    in response to a player request at said interactive controls, said client initiating a chance events based virtual game using said sequence of real world gaming chance events communicated from said server computer to said electronic gaming system and said player selections; and
    interactively presenting said virtual game to said player, wherein said client uses said player selections and said sequence together to determine said virtual game's game play and final outcome.

2. The method according to claim 1 wherein said real world gaming chance events are selected from the group consisting of:
    a deal of a playing card;
    a final position of a ball on a roulette wheel;
    a final position or indicator of a slot machine;
    a set of rolls of one or more die;
    a draw of one or more physical chance indicators;
    a draw of a labeled ball.

3. The method according to claim 1 wherein said one or more player actions affecting game play of a virtual game are selected from the group consisting of:
    selecting a particular arrangement of positions on a game card corresponding to chance events;
    taking or not taking a playing card from a deal;
    folding a hand of playing cards.

4. The method according to claim 1 further wherein:
said video clips are stored possible video clips; and
said video clips are presented in an order in response to said player selections and said sequence.

5. The method according to claim 1 further comprising:
providing a client-side user interface for use on a user gaming device allowing a user to activate a virtual game, and make one or more player selections to influence game play and a final outcome for a virtual game; and
providing client-side executable logic on a gaming device able to:
request a game video stream and real world chance event results sequence from a server;
receive a requested game video stream and real world chance event results sequence;
store in a buffer one or more game video streams and real world chance event results sequences;
present game video streams according to said real world chance event results sequence to a user so as to provide a virtual gaming experience in real time without delays.

6. The method according to claim 1 further comprising:
delivering and buffering a series of said video clips and said stored real world gaming chance events sequences;
presenting said stored real world gaming chance events sequences and video clips from a buffer to provide a live gaming experience without communications caused delays or latencies.

7. The method of claim 1 further comprising:
presenting virtual game chance event results and a final outcome to a player at a player gaming device at a desired time after said storing, wherein said virtual game chance event results are determined by supplying said stored results of said chance events as needed as determined by said one or more player selections during virtual game play;
wherein said one or more player selections affect the final outcome by altering which chance events of said real world gaming chance events sequence are presented to said player during a virtual game;
thereby further allowing a plurality of players at different times to be provided with custom and novel playing experiences using the same real world gaming chance events.

8. The method according to claim 1 wherein said capturing and said storing comprise:
capturing and storing a substantial number of real world chance events;
further comprising when requested by a user, delivering to a user a game based on a partially randomly selected sequence of stored real world chance events; and
wherein a stored sequence of real world gaming chance events provides a chance sequence for determining a game outcome but wherein said game outcome is also determined by one or more selections of options of at least one player.

9. The method according to claim 8 wherein said substantial number is greater than 100.

10. The method according to claim 8 wherein said substantial number is greater than 1000.

11. The method according to claim 1 wherein said chance events include at least some chance events associated with an historical game of some interest to a player.

12. A system providing chance-based virtual gaming based on real world gaming chance events comprising:
a client system comprising:
a display component for displaying information identifying available chance-based virtual games; and
an ordering component that in response to performance of a user action, sends a request to a server system to order a results sequence of real-world gaming chance events;
a decoding component able to read encoded data representing one or more sequences;
a player selection component that receives one or more player selections regarding game play;
a virtual game player component that determines play of a virtual game and a final outcome based on said results sequence and said player selections; and
a server system comprising:
a module that records and stores games with video or audio maintained in the form of individual video clips;
a transmitter module that sends the pre-recorded films to a player in a sequence that allows a player to play a game;
wherein to avoid a player experiencing delays in receiving video clips, said server system sends clips in a batch mode to said client system;
wherein said client system stores said sequence and provides one or more interactive controls allowing a player to make player selections that in combination with said sequence determine game play and a final outcome of a virtual game;
wherein said client system stores all possible video clips locally and creates a video experience at said client system that corresponds to virtual game play as determined by said chance events sequence and player selections.

13. The client system of claim 12 wherein the display component is a browser.

14. The method of claim 1 further comprising:
establishing a stream interface to at least one game stream provider, said game stream provider providing a plurality of game video clips using a video capturing system;
establishing a backend interface at said server computer system to at least one game backend provider, said game backend provider enabling gaming opportunities to players;
providing a plurality of gaming client computer systems to a player, said gaming client computer systems enabled to:
receive available game digital and computer readable data indicating available gaming options from one or more of said game backend providers;
present said available game data to players using gaming client computer systems;
receive indications from gaming client computer systems from players of desired games;
present a replay of a desired game using said game video clips at gaming client computer systems, said replay providing varying sequences of virtual game chance events based on player selections during game play.

15. The method according to claim 14 wherein at least one of said stream interface and said backend interface involve contractual arrangements with two different entities, said arrangements allowing said stream interface provider to receive at least some payment that is independent of whether any players select to play said stream or the outcome of any game.

16. The method according to claim 14 wherein said plurality of game video clips comprise one or more chance events, said chance events selected from the group consisting of:

a full deal of a deck of cards providing a specified sequence of card values;
a final position of a ball on a roulette wheel;
a final position or indicator of a slot machine;
one or a set of rolls of one or more die;
a draw of a labeled ball.

17. The method according to claim 14 wherein said plurality of game video clips comprise one or more chance events, said chance events selected from the group consisting of:
a deal of a deck of cards;
a final position of a ball or other indicator;
one or a set of rolls of dice;
a draw of one or more physical chance indicators.

18. The method according to claim 14 wherein said game server acts as a trusted $3^{rd}$ party and does not have any financial stake in the outcome of any game.

19. The method according to claim 14 wherein said gaming clients allow a user to make one or more selections affecting ongoing game play.

20. The method according to claim 1 further wherein:
said video clips are video clips of a particular real-world game; and
said video clips and said game results are presented in an order in response to said selections, while maintaining an overall sequence based on said real-world chance events.

21. The method according to claim 1 wherein said real-world chance events comp-rise a deal of a set of playing cards providing a specified sequence of card values.

22. The method according to claim 1 wherein said real-world chance events comprise one or a set of rolls of one or more die.

23. The method according to claim 1 further comprising:
thereby providing a number of virtual games with different virtual game play and different final outcomes all based on the same real world chance events where a players may be separated in space and time both from other players and from the real world chance events.

* * * * *